(12) United States Patent
Shinano et al.

(10) Patent No.: US 10,634,868 B2
(45) Date of Patent: Apr. 28, 2020

(54) LENS BARREL

(71) Applicant: Panasonic Intellectual Property Management Co., Ltd., Osaka (JP)

(72) Inventors: Fumio Shinano, Osaka (JP); Tetsuya Uno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 379 days.

(21) Appl. No.: 15/685,071

(22) Filed: Aug. 24, 2017

(65) Prior Publication Data
US 2017/0351053 A1 Dec. 7, 2017

Related U.S. Application Data

(63) Continuation of application No. PCT/JP2016/001247, filed on Mar. 8, 2016.

(30) Foreign Application Priority Data

Mar. 9, 2015 (JP) .................................. 2015-046500

(51) Int. Cl.
*G02B 7/02* (2006.01)
*G02B 15/22* (2006.01)
(Continued)

(52) U.S. Cl.
CPC ................. *G02B 7/09* (2013.01); *G02B 7/08* (2013.01); *G02B 7/10* (2013.01); *G02B 7/105* (2013.01);
(Continued)

(58) Field of Classification Search
CPC ...... G02B 7/105; G02B 7/102; G02B 15/173; G02B 7/021; G02B 7/14; G02B 7/023; G02B 7/04; G02B 7/026
(Continued)

(56) References Cited

U.S. PATENT DOCUMENTS

| 6,411,781 B1 | 6/2002 | Katagishi et al. |
| 2007/0242940 A1 | 10/2007 | Yumiki et al. |

(Continued)

FOREIGN PATENT DOCUMENTS

| JP | 2000-329989 | 11/2000 |
| JP | 2002-148505 | 5/2002 |

(Continued)

OTHER PUBLICATIONS

International Search Report of PCT application No. PCT/JP2016/001247 dated Jun. 7, 2016.

*Primary Examiner* — Dawayne Pinkney
(74) *Attorney, Agent, or Firm* — Renner, Otto, Boisselle & Sklar, LLP

(57) ABSTRACT

Lens barrel according to the present exemplary embodiment is provided with lens unit, stationary frame, focus ring, focus grip, and a fixing section. Lens unit has an optical system. Stationary frame supports lens unit to be movable in a direction of optical axis X of the optical system. Focus ring is disposed on an outer circumferential side of lens unit, and is rotated when focus adjustment is manually performed. Focus grip is provided to protrude outwardly from focus ring, and operated for rotating focus ring. The fixing section fixes focus ring to stationary frame when focus adjustment is automatically performed. The fixing section has fixing button which is disposed on focus grip and operated for fixing focus ring to stationary frame.

7 Claims, 21 Drawing Sheets

(51) Int. Cl.
*G02B 7/09* (2006.01)
*G02B 7/105* (2006.01)
*G02B 7/08* (2006.01)
*G03B 3/10* (2006.01)
*G02B 7/10* (2006.01)
*G02B 7/28* (2006.01)
*G03B 13/36* (2006.01)

(52) U.S. Cl.
CPC ............... *G02B 7/282* (2013.01); *G03B 3/10* (2013.01); *G03B 13/36* (2013.01)

(58) Field of Classification Search
USPC .................. 359/705–706, 694, 676, 811–830
See application file for complete search history.

(56) References Cited

U.S. PATENT DOCUMENTS

| | | |
|---|---|---|
| 2010/0214672 A1 | 8/2010 | Yumiki et al. |
| 2011/0026135 A1* | 2/2011 | Fujiwara ................ G02B 7/021 359/696 |
| 2013/0120637 A1 | 5/2013 | Yumiki et al. |

FOREIGN PATENT DOCUMENTS

| | | |
|---|---|---|
| JP | 2011-100076 | 5/2011 |
| WO | 2005/073773 | 8/2005 |

* cited by examiner

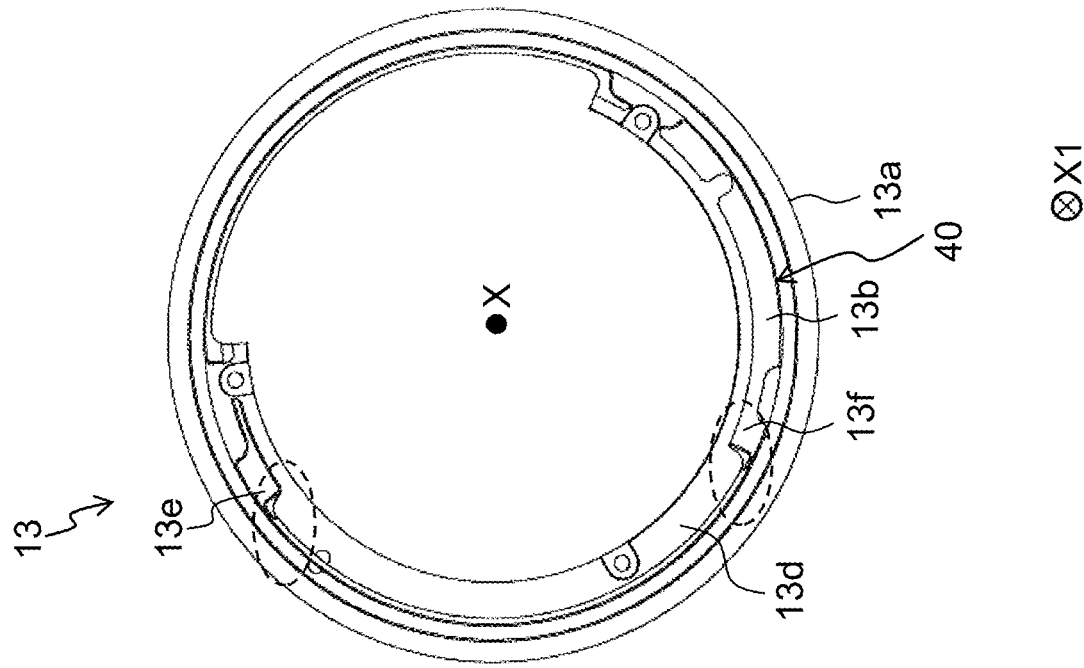
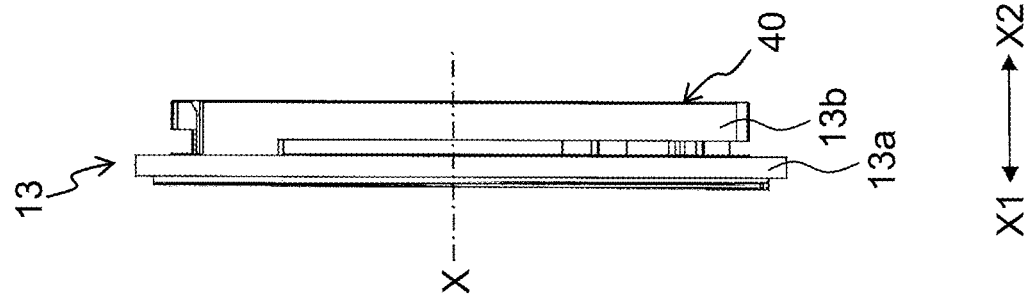
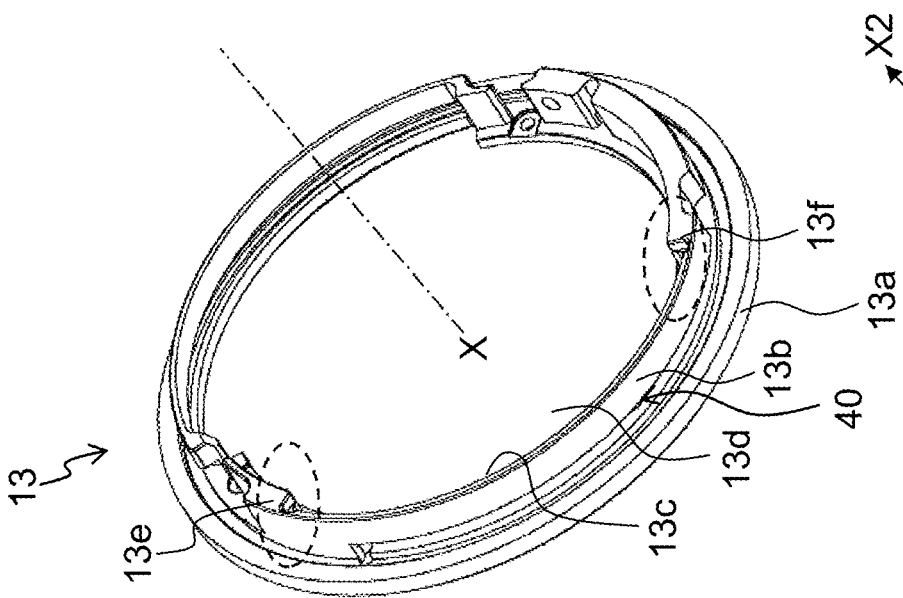

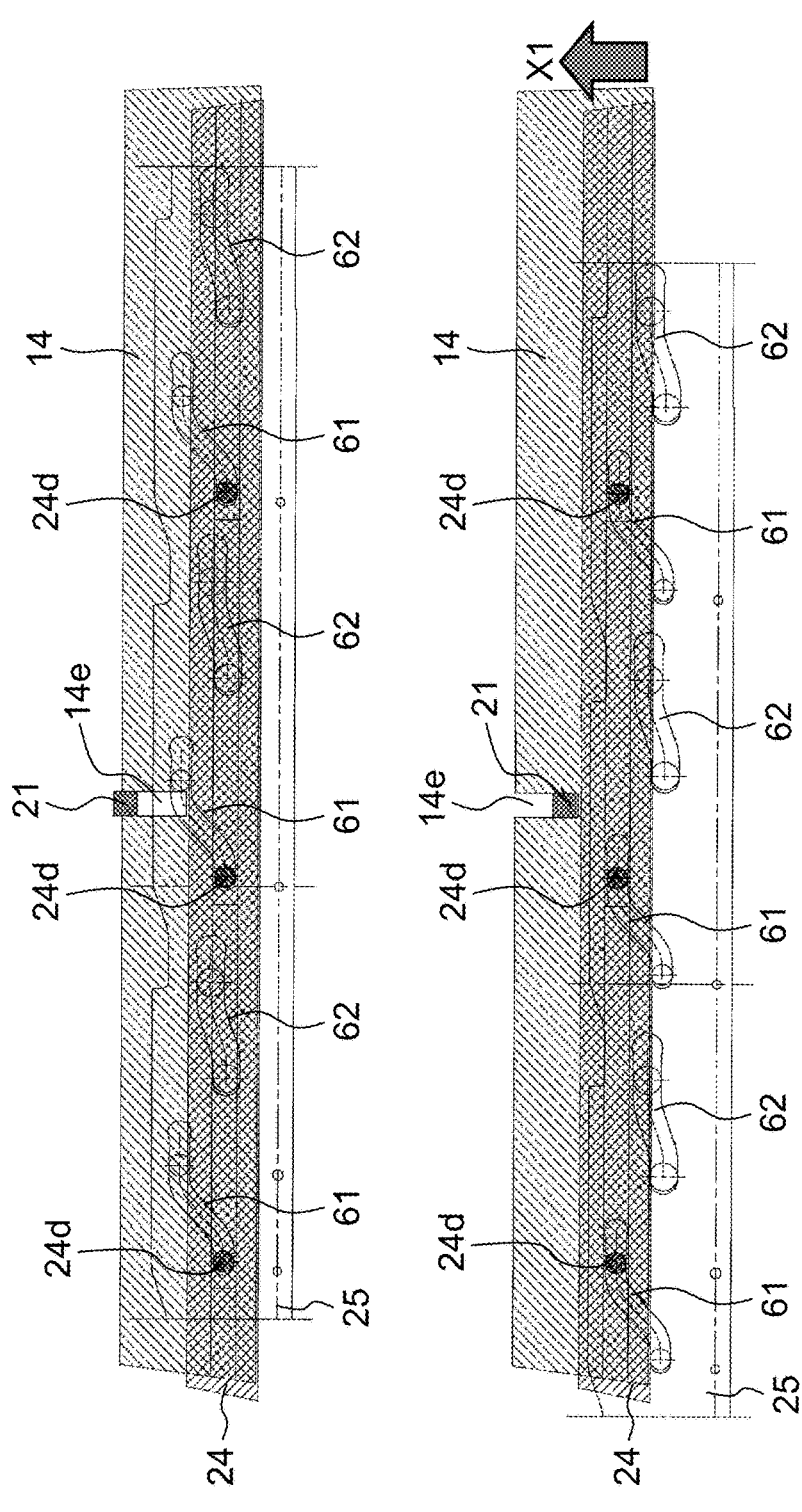

LENS BARREL

TECHNICAL FIELD

The present disclosure relates to a lens barrel.

BACKGROUND ART

There has been disclosed, as a lens barrel, a configuration provided with a switch for switching between an auto-focus mode and a manual focus mode and a focus ring for manually adjusting a focus in the manual focus mode (for example, see Unexamined Japanese Patent Publication No. 2011-100076).

In Unexamined Japanese Patent Publication No. 2011-100076, the switch is provided on the lens barrel, and the focus ring is disposed behind the switch in an optical axis direction.

SUMMARY

The above conventional lens barrel has a problem as described below.

Specifically, in the lens barrel disclosed in Unexamined Japanese Patent Publication No. 2011-100076, the switch and the focus ring are separately provided, resulting in poor operability.

For example, to quickly switch to the auto-focus mode during focus adjustment in the manual focus mode, a user needs to temporarily release his/her hand from the focus ring for operating the switch. Particularly while looking through a finder, the user fumbles the switch and then operates the switch, which is troublesome.

A lens barrel according to the present disclosure is provided with a lens unit, a support frame, a focus ring, an operating section, and a fixing section.

The lens unit has an optical system. The support frame supports the lens unit to be movable in a direction of an optical axis of the optical system. The focus ring is disposed on an outer circumferential side of the lens unit, and is rotated when focus adjustment is manually performed. The operating section is provided to protrude outwardly from the focus ring, and is operated for rotating the focus ring. The fixing section fixes the focus ring to the support frame when focus adjustment is automatically performed. The fixing section has a fixing button. The fixing button is disposed on the operating section, and is operated for fixing the focus ring to the support frame.

With the lens barrel according to the present disclosure, operability in switching between a manual focus mode and an auto-focus mode can be improved.

BRIEF DESCRIPTION OF DRAWINGS

FIG. 7A is a perspective view of an index ring of the lens barrel in FIG. 1.

FIG. 7B is a side view of the index ring in FIG. 7A.

FIG. 7C is a back view of the index ring in FIG. 7A.

FIG. 20A is a development view for describing a movement of the distance scale ring.

FIG. 20B is a development view for describing a movement of the distance scale ring.

DESCRIPTION OF EMBODIMENTS

Hereinafter, exemplary embodiments will be described in detail with reference to the drawings appropriately. However, descriptions in more detail than necessary may be omitted. For example, a detailed description of a matter which is already well-known, or an overlapped description for a substantially identical configuration may be omitted. This is intended to prevent the following description from becoming unnecessarily redundant and to facilitate understanding by those skilled in the art.

Here, the applicant provides the attached drawings and the following description such that those skilled in the art can sufficiently understand the present disclosure, and therefore, they do not intend to restrict the subject matters of claims.

First Exemplary Embodiment

Lens barrel 1 according to one exemplary embodiment of the present disclosure is described below with reference to FIGS. 1 to 21.

(General Configuration of Lens Barrel 1)

Figure 1:
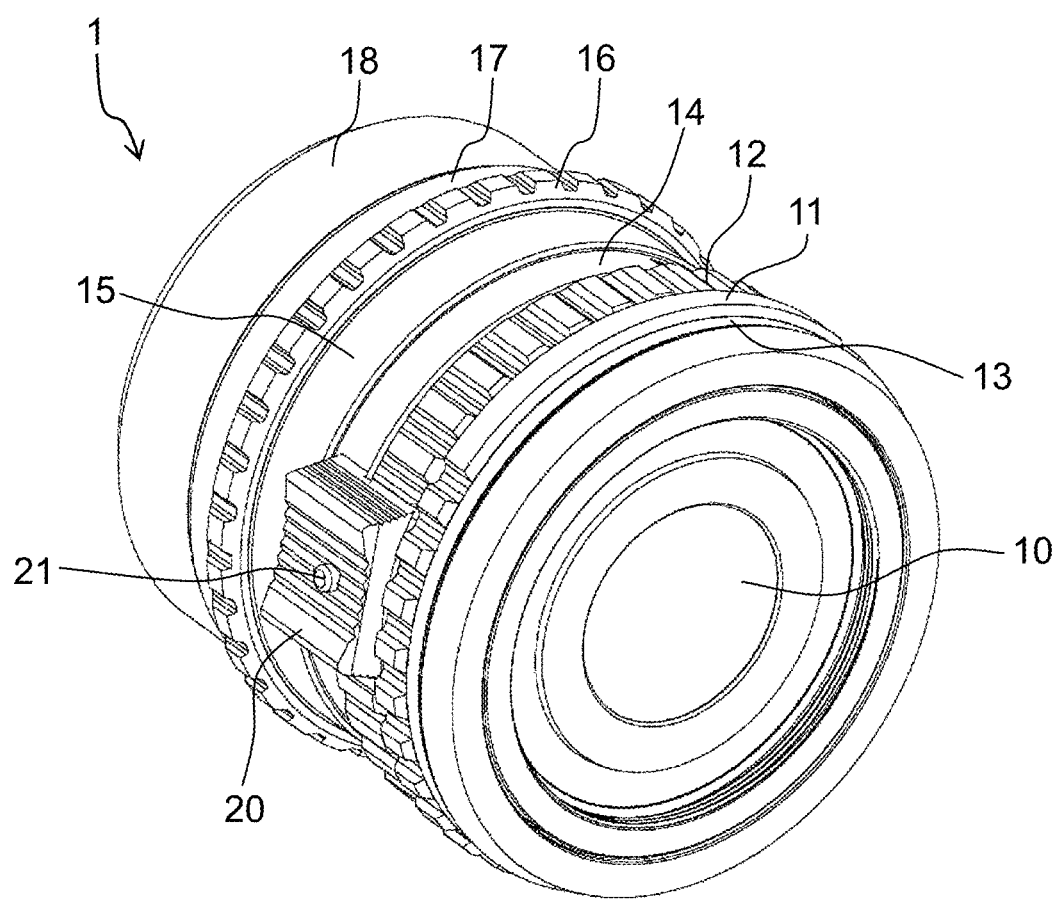
FIG. 1 is a perspective view illustrating an overall configuration of a lens barrel according to one exemplary embodiment of the present disclosure.
Figure 2:
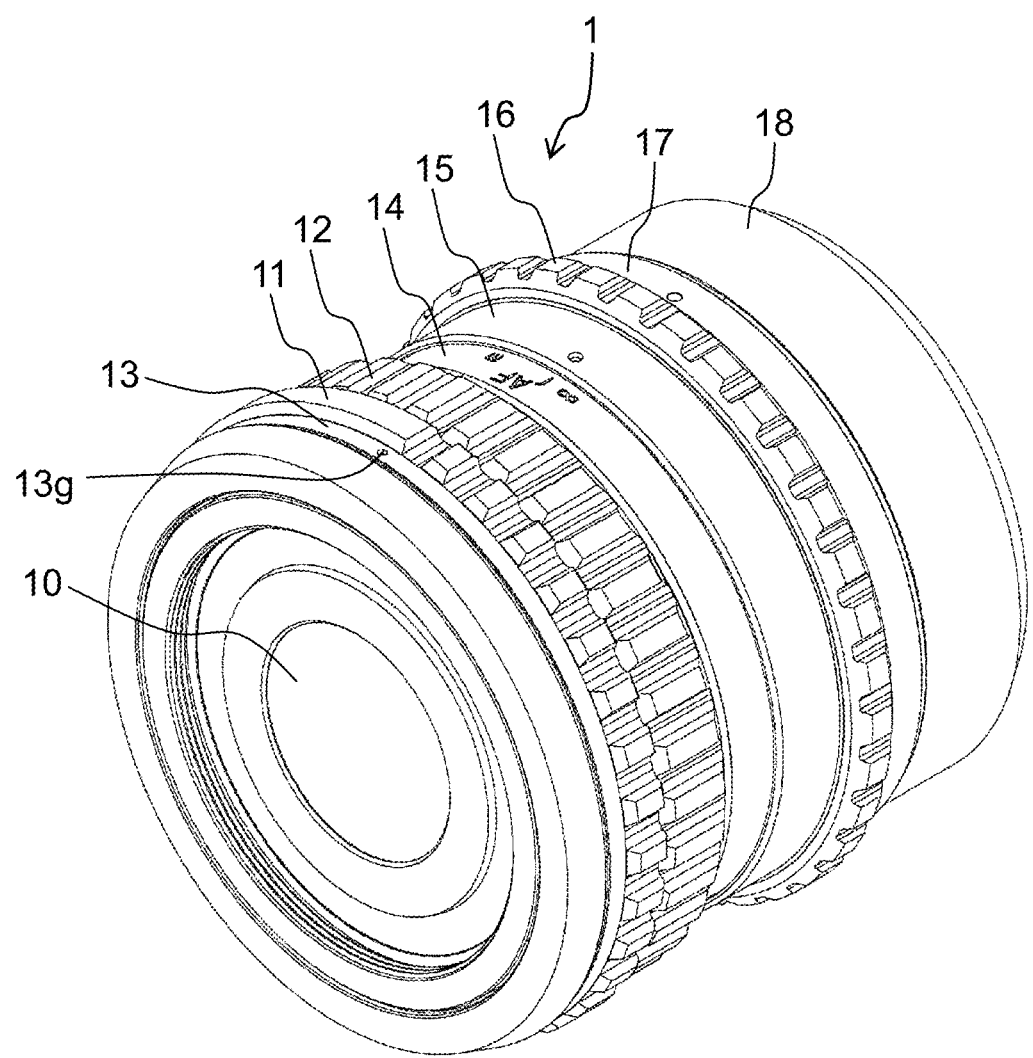
FIG. 2 is a perspective view illustrating the overall configuration of the lens barrel in FIG. 1.
Figure 3:
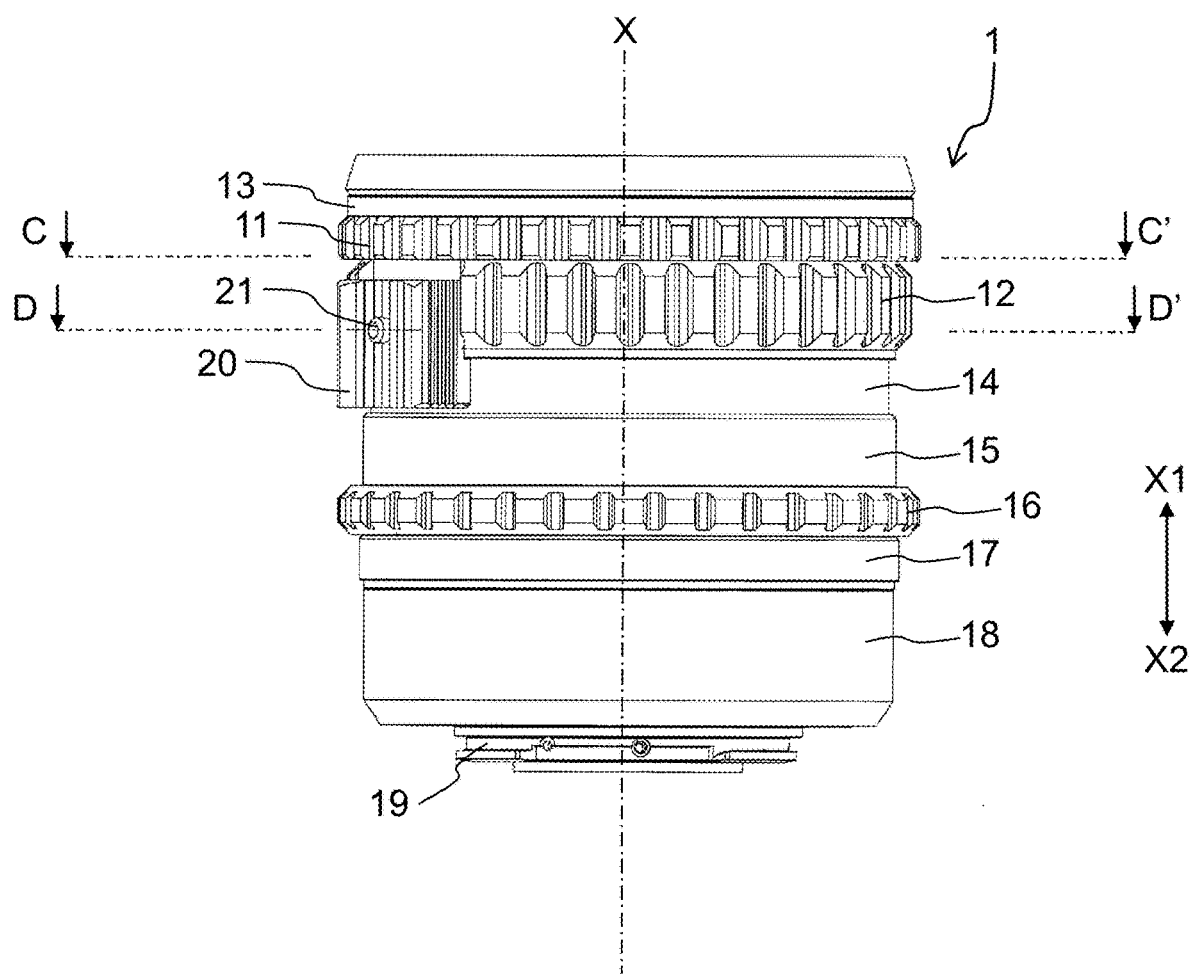
FIG. 3 is a plan view of the lens barrel in FIG. 1.
Figure 4:
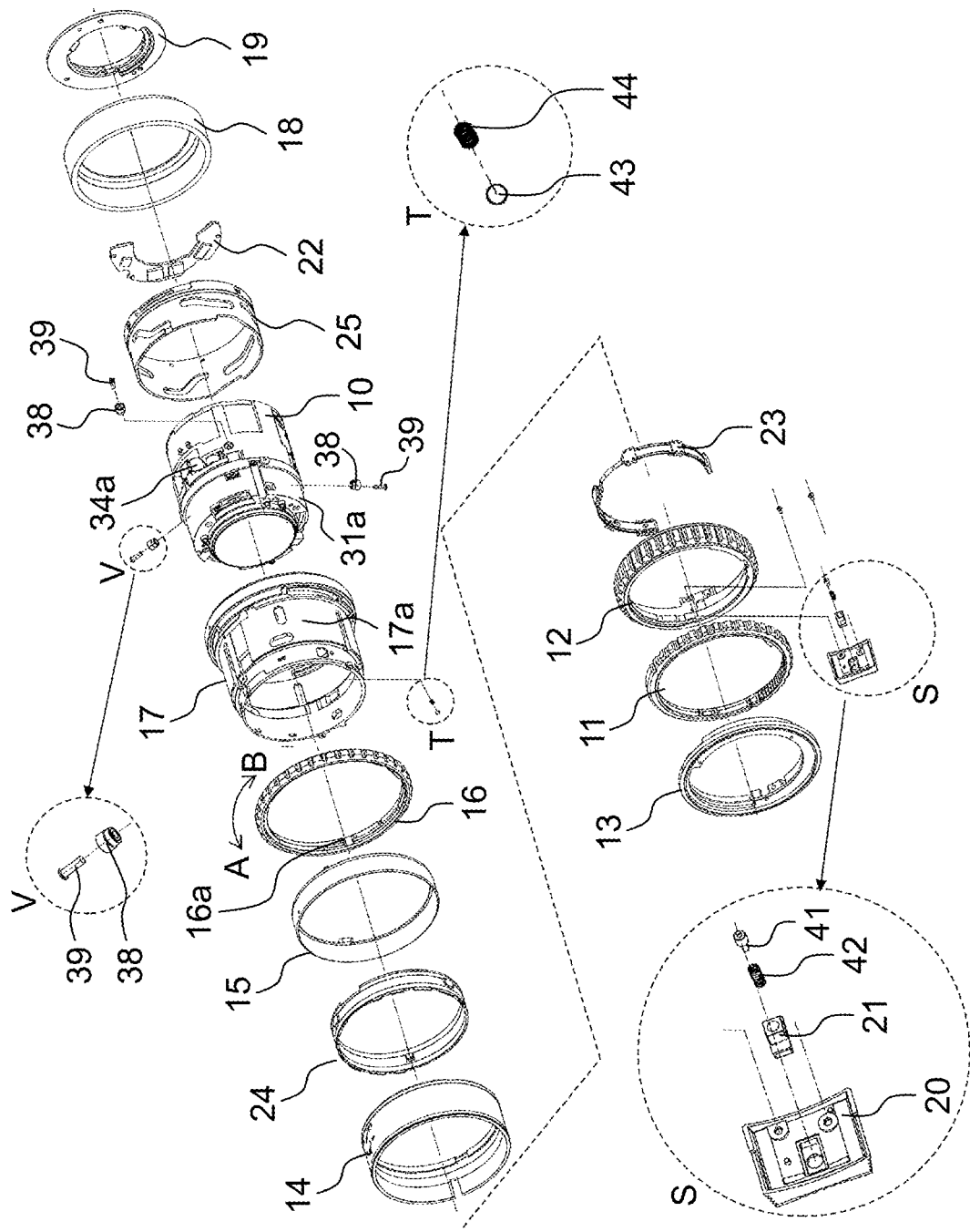
FIG. 4 is an exploded perspective view illustrating main components of the lens barrel in FIG. 1.

FIGS. 1 and 2 are perspective views illustrating an appearance configuration of lens barrel 1 according to the present exemplary embodiment. FIG. 3 is a plan view of lens barrel 1. FIG. 4 is an exploded perspective view of main components of lens barrel 1, wherein a decorative ring, a filter ring, and the like are not illustrated, for example.

Lens barrel 1 according to the present exemplary embodiment is detachable from a camera body (not illustrated). As illustrated in appearance views of FIGS. 1 to 3, lens barrel 1 mainly includes lens unit 10, aperture ring 11, focus ring 12, index ring 13, distance scale ring 14, depth-of-field scale ring 15, macro switching ring 16, stationary frame 17, rear frame 18, lens mount 19, focus grip 20, and fixing button 21.

Lens unit 10 has an optical system inside. Notably, in the description below, a front side indicates a subject side (a direction pointed by arrow X1 along optical axis X in FIG. 3) along the direction of optical axis X of lens unit 10, and a rear side indicates lens mount 19 side (a direction pointed by arrow X2 along optical axis X in FIG. 3) along the direction of optical axis X (see FIG. 3).

Aperture ring 11 is a ring-shaped member for adjusting an aperture of aperture unit 37 (see later-described FIG. 5) provided in lens unit 10. As illustrated in FIGS. 1 to 4, aperture ring 11 is disposed near a front end of lens barrel 1 in the direction of optical axis X (see FIG. 3). Aperture adjustment is achieved by rotating aperture ring 11.

Focus ring 12 is a ring-shaped member for adjusting a focus of a subject image formed on an image element by the optical system in lens unit 10. Focus ring 12 is disposed behind aperture ring 11 along the direction of optical axis X. In a manual focus mode, focus adjustment is manually performed by rotating focus ring 12.

Index ring 13 is disposed in front of aperture ring 11 in a state in which a portion thereof is inserted into aperture ring 11. Index ring 13 restricts the rotation of focus ring 12 with respect to lens unit 10 within a predetermined range.

Distance scale ring 14 is rotated with the rotation of focus ring 12, and indicates information of a distance to a subject. Distance scale ring 14 is disposed behind focus ring 12. Distance scale ring 14 has a scale of distance for normal shooting and a scale of distance for macro shooting.

Depth-of-field scale ring 15 is disposed behind distance scale ring 14, and has a scale of a depth of field.

Macro switching ring 16 is a ring-shaped member for switching between a normal shooting mode and a macro shooting mode. Macro switching ring 16 is disposed behind depth-of-field scale ring 15. When macro switching ring 16 is rotated, distance scale ring 14 and lens unit 10 move along the direction of the optical axis, so that switching between the normal shooting mode and the macro shooting mode is performed.

Stationary frame 17 is disposed inside of focus ring 12, aperture ring 11, index ring 13, distance scale ring 14, depth-of-field scale ring 15, and macro switching ring 16 so as to rotatably support these ring-shaped members. In addition, stationary frame 17 is disposed outside of lens unit 10 so as to support lens unit 10 to be movable in the direction of the optical axis.

Rear frame 18 is connected to stationary frame 17, and lens mount 19 is connected to stationary frame 17 or rear frame 18. Due to lens mount 19, lens barrel 1 is detachable from a camera body.

Focus grip 20 (one example of an operating section) is disposed to protrude from focus ring 12 on the outer circumference of focus ring 12 as illustrated in FIGS. 1 to 3. Focus grip 20 is a member on which, when a user rotates focus ring 12, a finger is hooked so that the user is easy to perform the rotation. As illustrated in FIG. 1, focus grip 20 is curved in such a way that the center thereof along the circumference of lens barrel 1 is recessed so that the user is easy to put his/her finger thereon. In addition, the surface of focus grip 20 is formed with irregularities for allowing the user to easily place his/her finger.

Fixing button 21 is disposed on focus grip 20 in a state in which a portion thereof is exposed from the surface of focus grip 20. Fixing button 21 is pressed to achieve automatic focus adjustment. Fixing button 21 constitutes a portion of fixing section 40 (described later) for fixing focus ring 12 to stationary frame 17 together with rotation restricting section 13b (described later) of index ring 13.

(Lens Unit)

Figure 5:
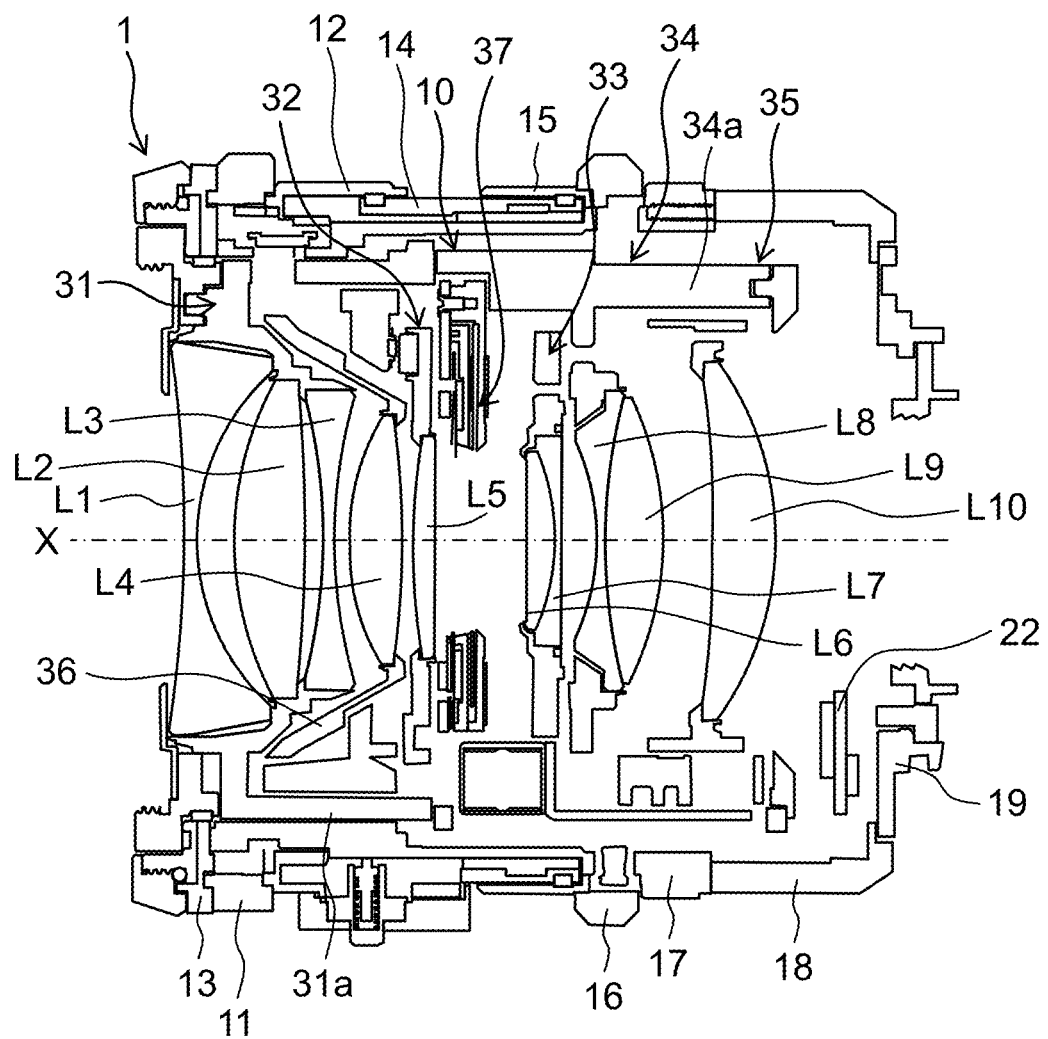
FIG. 5 is a sectional view illustrating an internal configuration of the lens barrel in FIG. 1.

FIG. 5 is a view illustrating an internal structure of lens barrel 1 according to the present exemplary embodiment. Lens unit 10 has substantially a cylindrical outer shape, and includes six lens frames (first group lens frame unit 31, second group lens frame unit 32, third group lens frame unit 33, fourth group lens frame unit 34, fifth group lens frame unit 35, and lens frame 36) holding the optical system including ten lenses L1 to L10 along optical axis X, and aperture unit 37, as illustrated in FIG. 5.

Ten lenses L1 to L10 are disposed in this order from a front side (subject side) along optical axis X as illustrated in FIG. 5, and guide a subject image to the image element (not illustrated) mounted on the camera body.

As illustrated in FIG. 5, first group lens frame unit 31 is disposed closest to the subject side, and includes cylindrical section 31a constituting an outer frame of lens unit 10 and three lenses L to L3 held inside cylindrical section 31a.

Second group lens frame unit 32 is disposed inside cylindrical section 31a and includes lens L5, as illustrated in FIG. 5. Lens L5 has a convex shape on the subject side, and is disposed behind lens L3 along optical axis X as illustrated in FIG. 5.

Lens frame 36 is disposed inside cylindrical section 31a of first group lens frame unit 31 and includes lens L4. Lens L4 is disposed between lens L3 and Lens L5.

As illustrated in FIG. 5, third group lens frame unit 33 is disposed on the inner circumference side of cylindrical section 34a of fourth group lens frame unit 34 in a movable manner along optical axis X. Third group lens frame unit 33 includes lenses L6, L7. Third group lens frame unit 33 is moved back and forth in the direction of optical axis X by operating an actuator (not illustrated). Lens L6 has a convex shape on the camera body (not illustrated) side, and is disposed downstream of aperture unit 37 as viewed from the subject side in the direction of optical axis X. Lens L7 has a concave shape to mate with the convex shape of lens L6, and is disposed in contact with lens L6.

As illustrated in FIG. 5, fourth group lens frame unit 34 includes cylindrical section 34a constituting an outer frame of lens unit 10 and two lenses L8, L9 held inside cylindrical section 34a. Lens L8 is concave on both of the subject side and the camera body side, and is disposed behind lens L5. Lens L9 is disposed behind lens L8, and has a convex shape to mate with the concave shape of lens L8.

As illustrated in FIG. 5, fifth group lens frame unit 35 is disposed on the inner circumference side of cylindrical section 34a of fourth group lens frame unit 34 in a movable manner along optical axis X. Fifth group lens frame unit 35 is disposed behind lens L9. Fifth group lens frame unit 35 is moved back and forth in the direction of optical axis X by operating an actuator (not illustrated). Fifth group lens frame unit 35 holds lens L10.

Lens L10 has a convex shape on the camera body (not shown) side, and is disposed downstream of lens L9 as viewed from the subject side in the direction of optical axis X. That is, Lens L10 is disposed closest to lens mount 19 in the optical system included in lens barrel 1.

Aperture unit 37 is disposed between second group lens frame unit 32 and third group lens frame unit 33. An aperture is adjusted by an operation of aperture ring 11.

Note that lens control board 22 for moving lens frame units in lens unit 10 is disposed behind lens unit 10 as illustrated in FIGS. 4 and 5.

As illustrated in enlarged view V in FIG. 4, cam pin 38 is fixed by means of screw 39 on the outer surface of cylindrical section 34a of fourth group lens frame unit 34 in lens unit 10. Three cam pins 38 are provided at substantially regular intervals on the outer circumferential surface of the cylindrical section of fourth group lens frame unit 34.

(Focus Ring, Index Ring)

Focus ring 12 is disposed on the outer circumference of stationary frame 17. Focus ring 12 is rotated by a user when the user performs manual focus adjustment. For this end, outer circumferential surface 12a of focus ring 12 is formed with irregularities for facilitating the rotation.

Focus ring 12 is disposed on the outer circumference of stationary frame 17 in a rotatable manner, and the rotation beyond a predetermined range is restricted by index ring 13 fixed to stationary frame 17.

Figure 6:
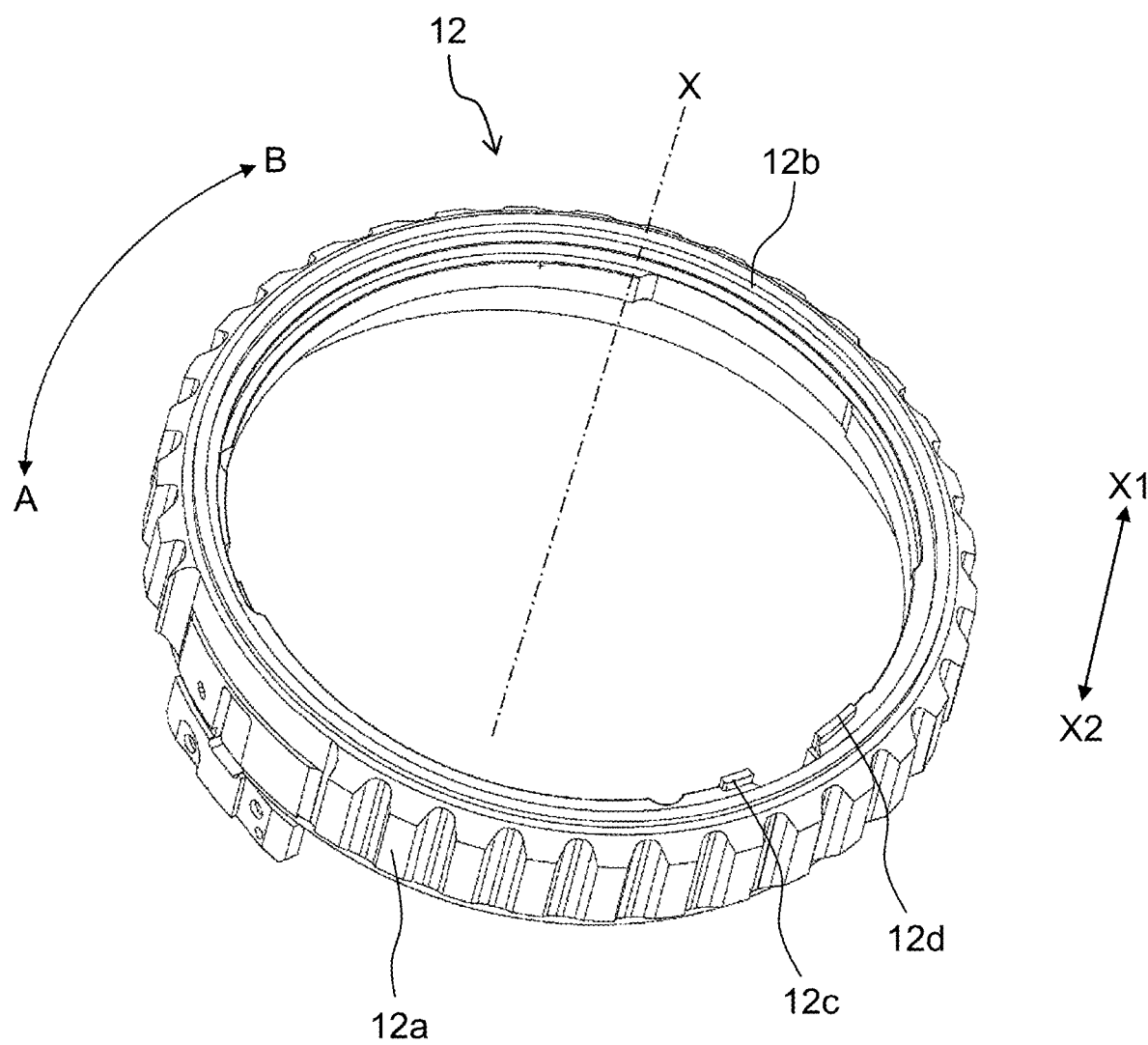
FIG. 6 is a perspective view of a focus ring of the lens barrel in FIG. 1.

FIG. 6 is a perspective view of focus ring 12. Two protrusions 12c, 12d protruding forward are formed on front peripheral edge 12b of focus ring 12 with a predetermined space therebetween. Two protrusions 12c, 12d are disposed close to each other in the circumferential direction.

Figure 8:
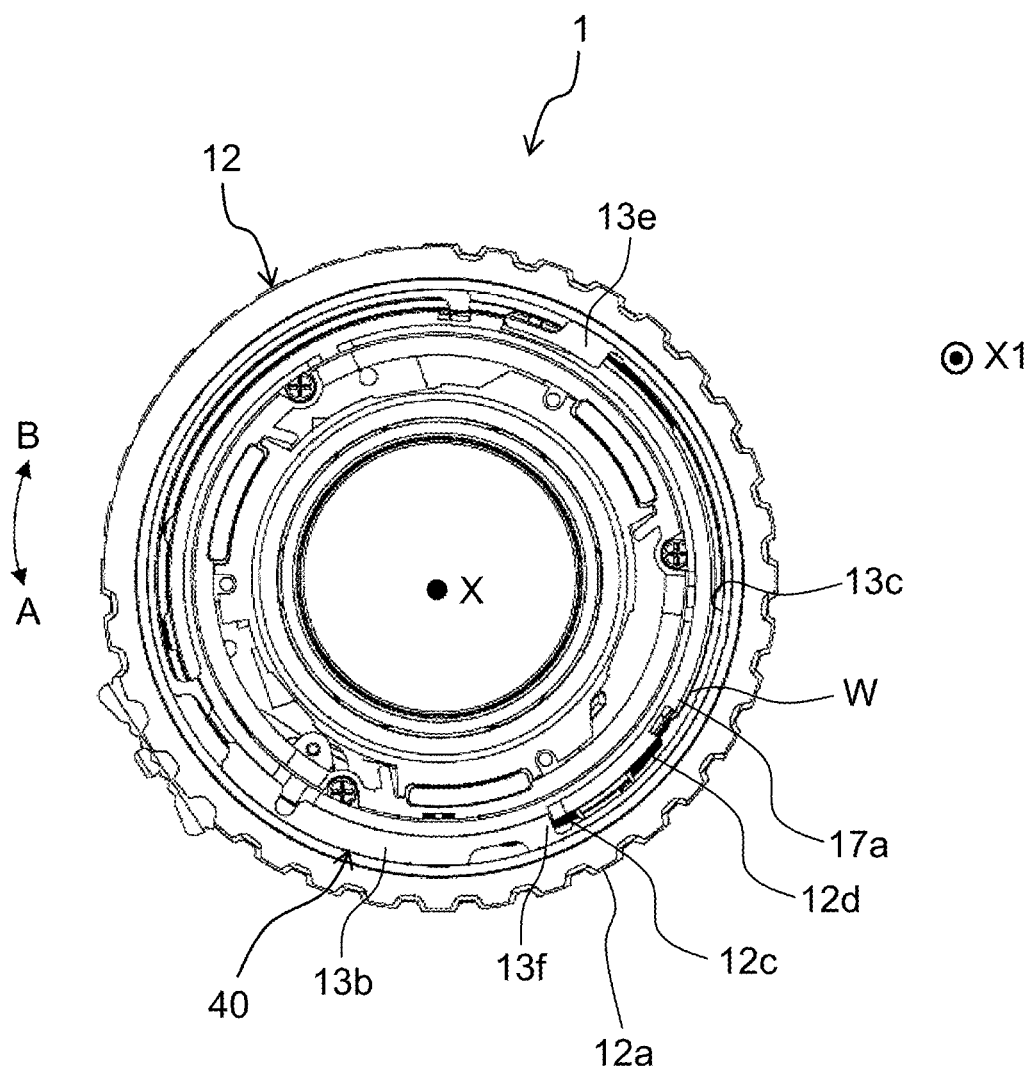
FIG. 8 is a sectional view taken along line CC' in FIG. 3 as viewed from arrows.

FIG. 7A is a perspective view of index ring 13, FIG. 7B is a side view of index ring 13, and FIG. 7C is a front view of index ring 13. FIG. 8 is a sectional view taken along line CC' in FIG. 3 as viewed from arrows.

Index ring 13 has mark indicator 13a and rotation restricting section 13b. Mark indicator 13a is exposed outside of lens barrel 1, and reference position mark 13g (see FIG. 2) is applied on mark indicator 13a as a reference for adjustment of an aperture scale. Rotation restricting section 13b has an outer diameter smaller than that of mark indicator 13a, and is inserted into aperture ring 11. Rotation restricting section 13b restricts the rotation of aperture ring 11 and focus ring 12 within a predetermined range.

As illustrated in FIGS. 7A to 7C, insertion section 13d into which protrusions 12c and 12d are inserted is formed on inner circumferential surface 13c of rotation restricting section 13b. Walls 13e, 13f (see dotted sections in FIGS. 7A to 7C) are formed on both ends of insertion section 13d. Due to walls 13e, 13f, space W is formed between inner circumferential surface 13c of rotation restricting section 13b of index ring 13 and outer surface 17a of stationary frame 17, and protrusions 12c and 12d are inserted into space W.

Protrusions 12c, 12d can move along the circumferential direction between walls 13e and 13f.

In FIG. 6, when focus ring 12 is rotated in a direction of arrow A, a focus is on a near side. When focus ring 12 is rotated in a direction of arrow B, a focus is moved to a far side. A position of focus ring 12 at the end in the direction of arrow B is a position (hereinafter referred to as an auto-focus position) where focus ring 12 is fixed to stationary frame 17 in an auto-focus mode for automatically performing focus adjustment. In addition, a position of focus ring 12 at the end in the direction of arrow A is a nearest position where the distance to a subject is the shortest in a manual focus mode for manually performing focus adjustment.

Figure 9:
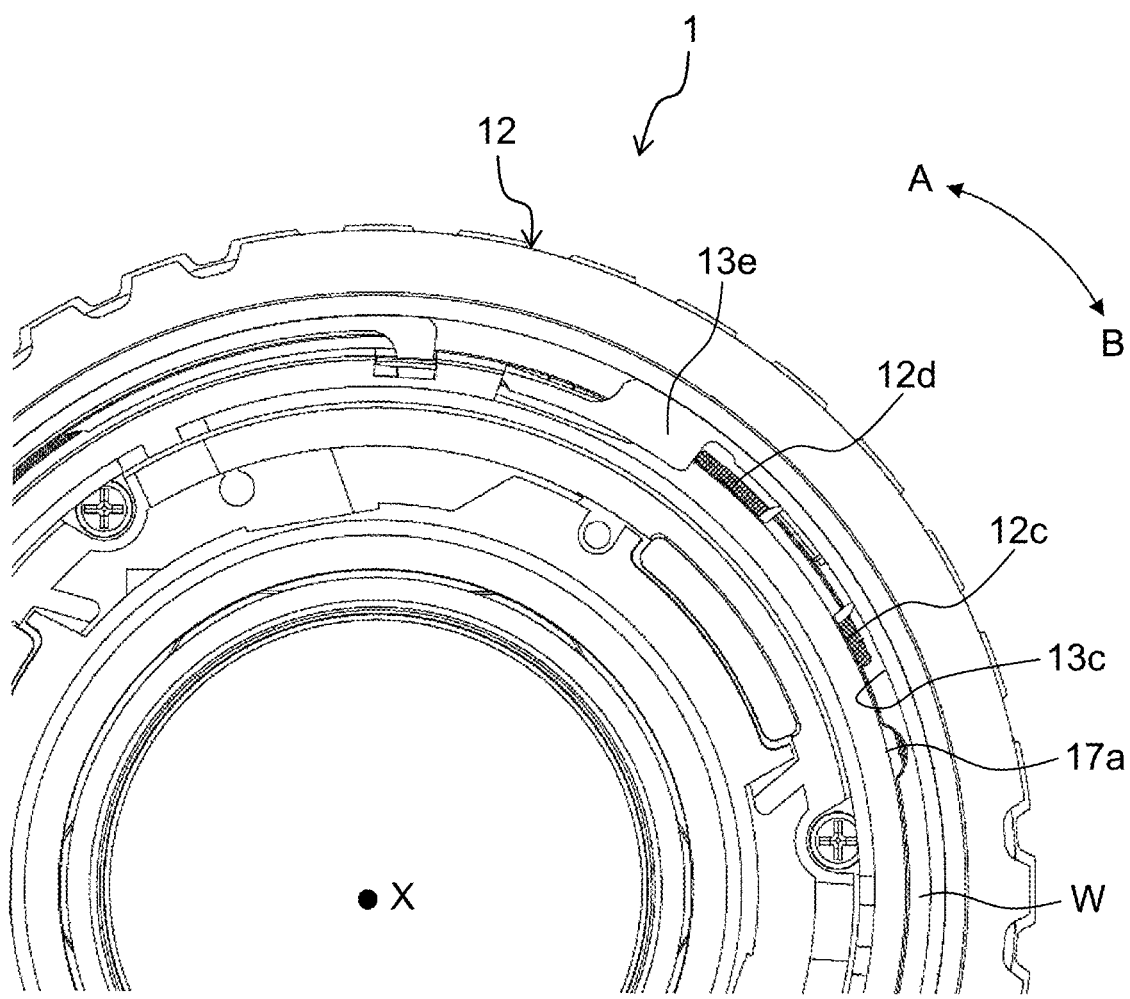
FIG. 9 is a view illustrating a state where the focus ring reaches a nearest position in the sectional view in FIG. 8.

FIG. 9, which corresponds to a partial enlarged view of FIG. 8, is a view illustrating a state where the rotation of focus ring 12 is restricted by rotation restricting section 13b when focus ring 12 is rotated in the direction of arrow A. As illustrated in FIG. 9, when focus ring 12 is rotated in the direction of arrow A, protrusion 12d is in contact with wall 13e, so that further rotation of focus ring 12 in the direction of arrow A is restricted.

Figure 10:
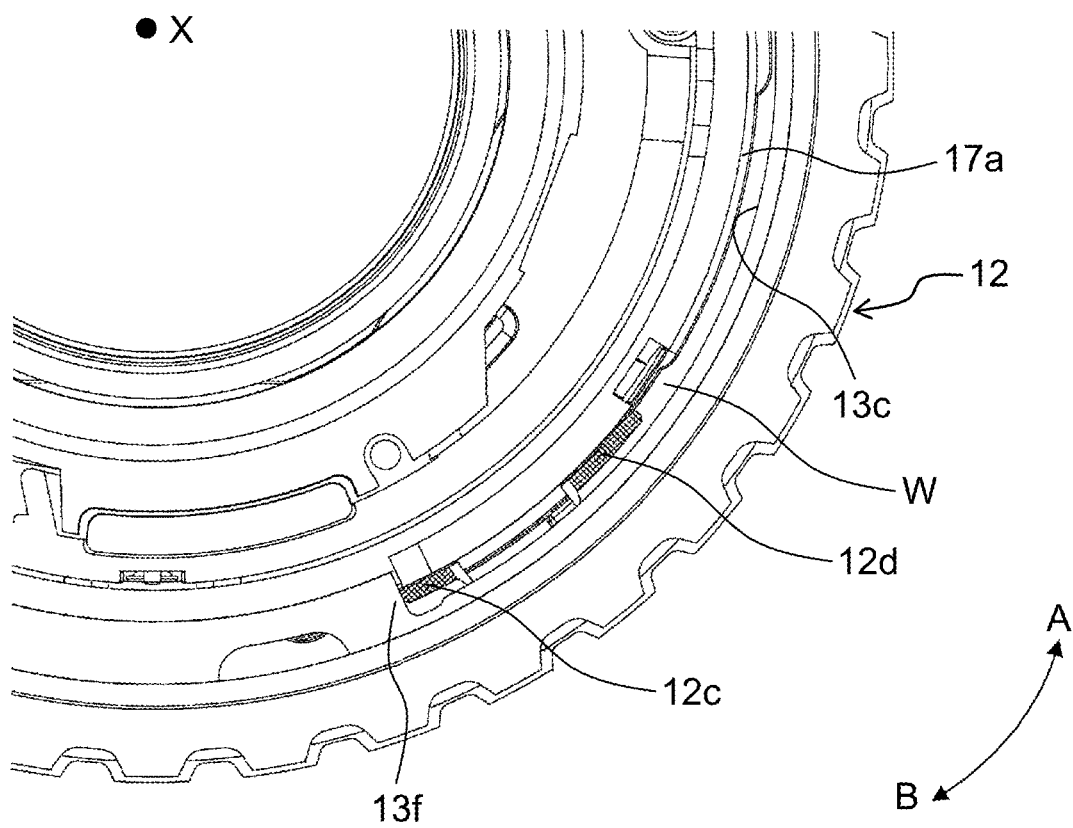
FIG. 10 is a view illustrating a state where the focus ring reaches an auto-focus position in the sectional view in FIG. 8.

FIG. 10, which corresponds to a partial enlarged view of FIG. 8, is a view illustrating a state where the rotation of focus ring 12 is restricted by rotation restricting section 13b when focus ring 12 is rotated in the direction of arrow B. As illustrated in FIG. 10, when focus ring 12 is rotated in the direction of arrow B, protrusion 12c is in contact with wall 13f, so that further rotation of focus ring 12 in the direction of arrow B is restricted.

Note that the rotation position of focus ring 12 is detected by linear encoder 23 (see FIG. 4) and transmitted to lens control board 22 and the like.

(Fixing Section)

Figure 11A:
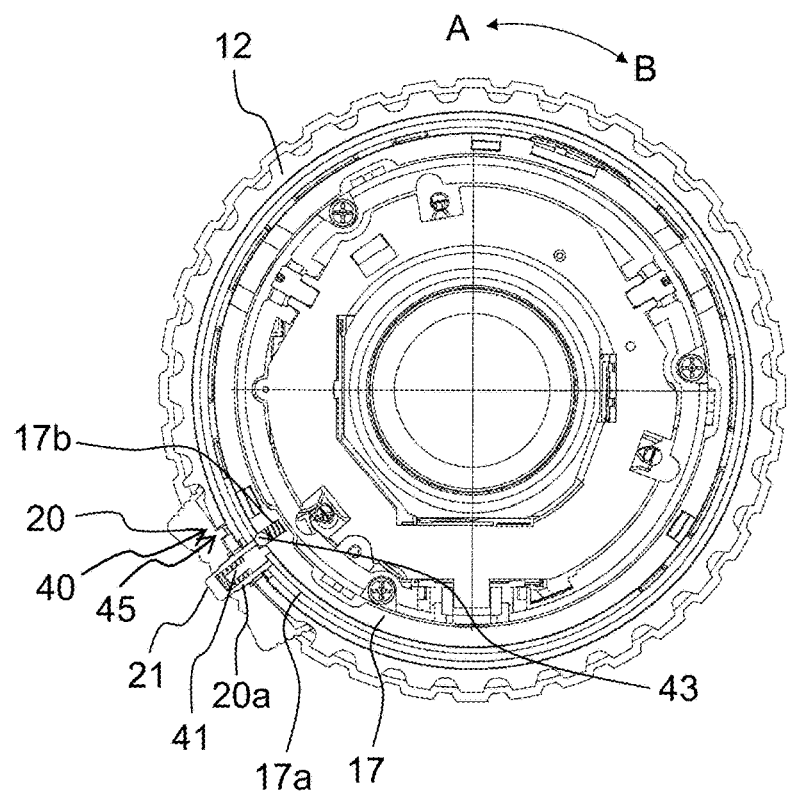
FIG. 11A is a sectional view taken along line DD' in FIG. 3 as viewed from arrows.
Figure 11B:
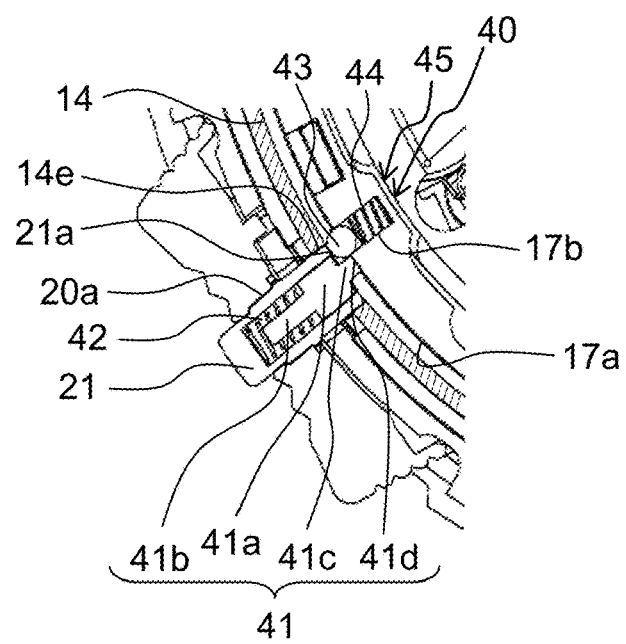
FIG. 11B is a partial enlarged view of FIG. 11A.

FIG. 11A is a sectional view taken along line DD' in FIG. 3 as viewed from arrows. FIG. 11A is a view illustrating a state where focus ring 12 is rotated in the direction of arrow B. FIG. 11B is a partial enlarged view of a vicinity of fixing button 21 in FIG. 11A. An enlarged view of an S section in FIG. 4 illustrates focus grip 20 and fixing button 21.

Fixing section 40 fixes focus ring 12 to stationary frame 17 in the auto-focus mode.

Fixing section 40 includes rotation restricting section 13b (one example of a first restricting section) illustrated in FIGS. 7A to 7C, and movement restricting section 45 (one example of a second restricting section) illustrated in FIGS. 11A, 11B. Rotation restricting section 13b restricts the rotation of focus ring 12 so that focus ring 12 can rotate and move only within a range between the auto-focus position (one example of a first position) and the nearest position (one example of a second position) as mentioned above.

Movement restricting section 45 restricts the rotational movement of focus ring 12 to the auto-focus position and the rotational movement of focus ring 12 from the auto-focus position.

Movement restricting section 45 includes fixing button 21, fixing pin 41, fixing button spring 42, fixing ball 43, and fixing ball spring 44.

Fixing button 21 is inserted into through-hole 20a formed on focus grip 20. The radially outer side of fixing button 21 with respect to optical axis X is exposed from the outer surface of focus grip 20.

Fixing button 21 has an internal space which is open inwardly in the radial direction, and fixing pin 41 is inserted into the internal space. In other words, fixing button 21 is disposed to cover fixing pin 41. Fixing pin 41 has first part 41a having a columnar shape, second part 41b with a diameter smaller than the diameter of first part 41a, and third part 41c with a diameter smaller than the diameter of first part 41a. First part 41a, second part 41b, and third part 41c are disposed in such a way that center axes thereof are oriented in the radial direction with respect to the direction of optical axis X. Second part 41b is disposed on a radially outer surface of first part 41a and third part 41c is disposed on a radially inner surface of first part 41a.

Inner end 41d of fixing pin 41 is in contact with outer surface 17a of stationary frame 17.

Fixing button spring 42 is disposed in the internal space of fixing button 21 by being externally inserted into second part 41b. Fixing button spring 42 is disposed such that a radially inner end of fixing button spring 42 is in contact with first part 41a, and a radially outer end of fixing button spring 42 is in contact with a radially outer surface of the internal space of fixing button 21. Due to fixing button spring 42, fixing button 21 is biased radially outwardly with respect to fixing pin 41.

In addition, recess 17b is formed on outer surface 17a of stationary frame 17, and fixing ball spring 44 is inserted into recess 17b.

Fixing ball 43 is fitted to recess 17b to be disposed radially outside of fixing ball spring 44. Fixing ball 43 is biased radially outwardly by fixing ball spring 44.

Fixing ball 43 restricts the rotational movement of focus ring 12 so that focus ring 12 does not accidentally move to the auto-focus position when the focus ring 12 is rotated in the direction of arrow B. In addition, fixing ball 43 restricts the movement of focus ring 12 in the direction of arrow A from the auto-focus position so as to inhibit the switching to the manual focus mode by accidental rotation of focus ring 12 in the direction of arrow A from the auto-focus position. This will be described later with reference to FIGS. 12 and 13.

(Switching to Auto-Focus Mode from Manual Focus Mode)

In switching to the auto-focus mode from the manual focus mode, focus ring 12 is fixed to stationary frame 17.

Figure 12A:
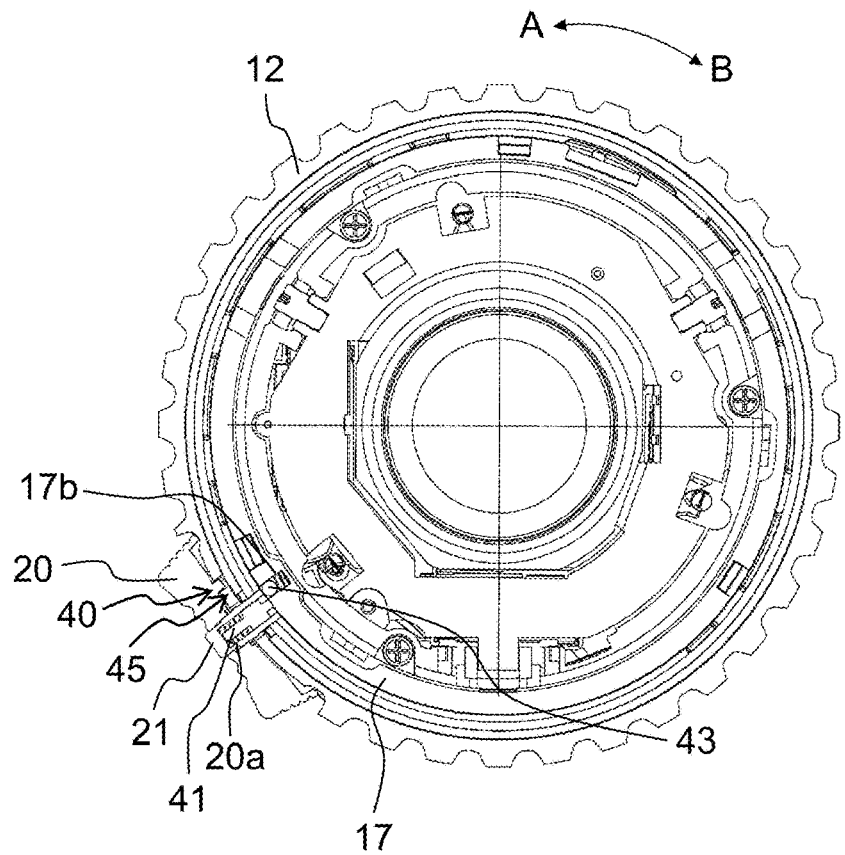
FIG. 12A is a sectional view taken along line DD' in FIG. 3 as viewed from arrows.
Figure 12B:
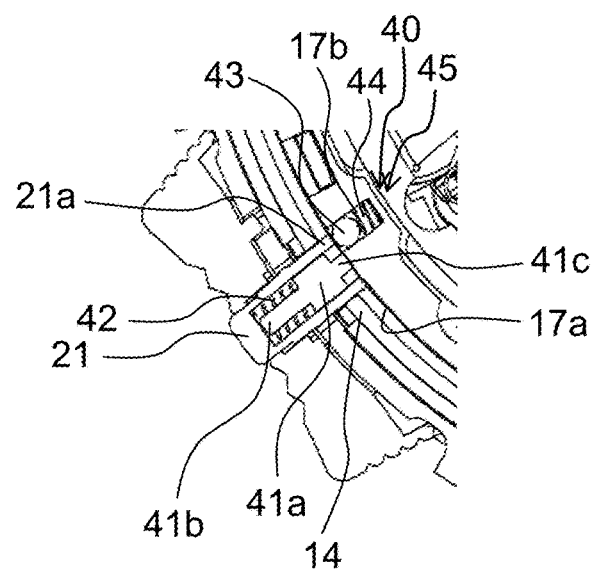
FIG. 12B is a partial enlarged view of FIG. 12A.
Figure 13A:
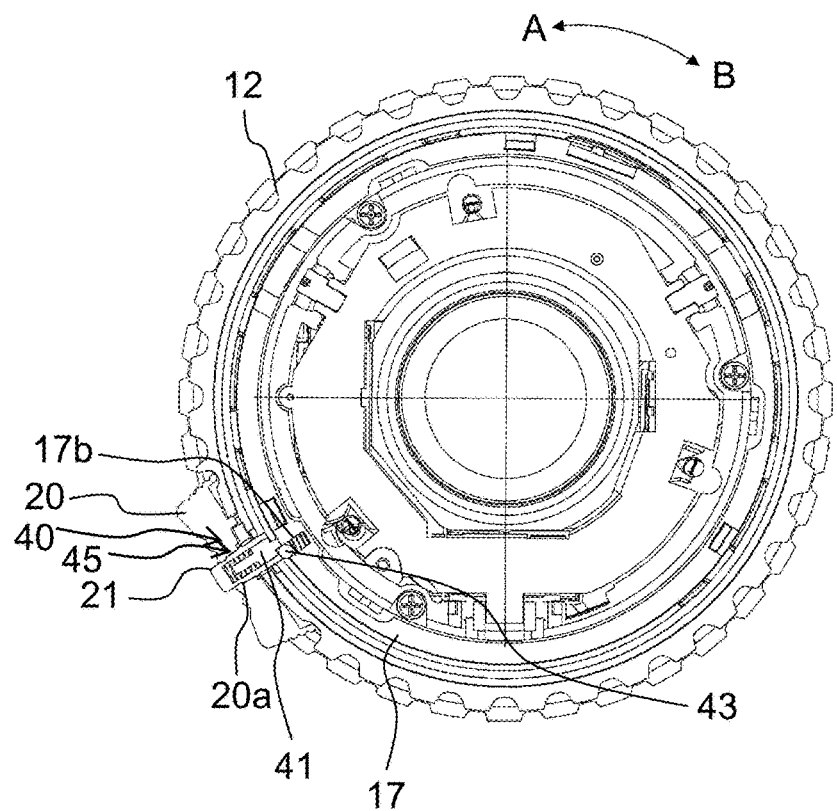
FIG. 13A is a sectional view taken along line DD' in FIG. 3 as viewed from arrows.
Figure 13B:
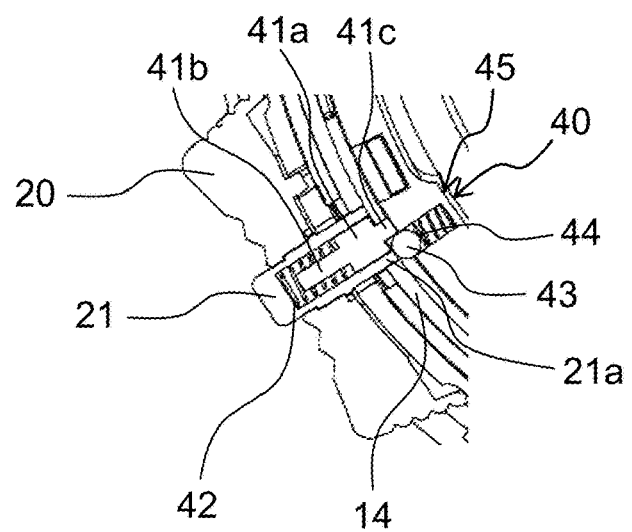
FIG. 13B is a partial enlarged view of FIG. 13A.

An operation for fixing focus ring 12 to stationary frame 17 in the configuration described above will be described below. FIGS. 12A and 13A are sectional views taken along line DD' in FIG. 3 as viewed from arrows for describing the operation for fixing focus ring 12. FIG. 12B is a partial enlarged view of FIG. 12A, and FIG. 13B is a partial enlarged view of FIG. 13A.

When focus ring 12 is rotated in the direction of arrow B for switching from the manual focus mode to the auto-focus mode, fixing ball 43 projecting from outer surface 17a of stationary frame 17 is brought into contact with third part 41c of fixing pin 41, so that the rotation of focus ring 12 in the direction of arrow B is restricted (see FIGS. 11A, 11B). In this way, the movement of focus ring 12 toward the auto-focus position in the direction of arrow B is restricted, whereby accidental switching from the manual focus mode to the auto-focus mode by a user can be prevented.

In the state where the movement is restricted by fixing ball 43, radially inner end 21a of fixing button 21 is located radially outside of fixing ball 43 as illustrated in FIGS. 11A, 11B.

When the user presses fixing button 21, fixing ball 43 is pushed into recess 17b by radially inner end 21a of fixing button 21 to cancel the restriction of fixing pin 41 by fixing ball 43 as illustrated in FIGS. 12A, 12B.

When focus ring 12 is further moved in the direction of arrow B with fixing button 21 being pushed, fixing pin 41 passes through recess 17b, so that focus ring 12 reaches the auto-focus position, as illustrated in FIGS. 13A, 13B.

When the user stops pushing fixing button 21, fixing button 21 is moved radially outwardly by fixing button spring 42, which releases the state where fixing ball 43 is pushed into recess 17b. Accordingly, fixing ball 43 protrudes from recess 17b by biasing force of fixing ball spring 44, and is disposed on a position adjacent to fixing pin 41 on rotation direction A side. Specifically, fixing ball 43 is adjacent to third part 41c of fixing pin 41 on rotation direction A side as being in contact with first part 41a.

Therefore, even when focus ring 12 is moved in the direction of arrow A, fixing ball 43 interferes with fixing pin 41, whereby the movement of focus ring 12 in the direction of arrow A is restricted. In this way, the movement of focus ring 12 from the auto-focus position in the direction of arrow A is restricted, whereby accidental switching from the auto-focus mode to the manual focus mode by the user can be prevented.

On the other hand, on the position of focus ring 12 illustrated in FIGS. 13A, 13B, protrusion 12c of focus ring 12 is in contact with wall 13f to restrict the movement of focus ring 12 in the direction of arrow B as illustrated in FIG. 10.

Due to the restriction of rotation in the direction of arrow A by fixing ball 43 and the restriction of rotation in the direction of arrow B by wall 13f, focus ring 12 is fixed on the auto-focus position illustrated in FIGS. 13A, 13B.

(Distance Scale Ring)

Figure 14:
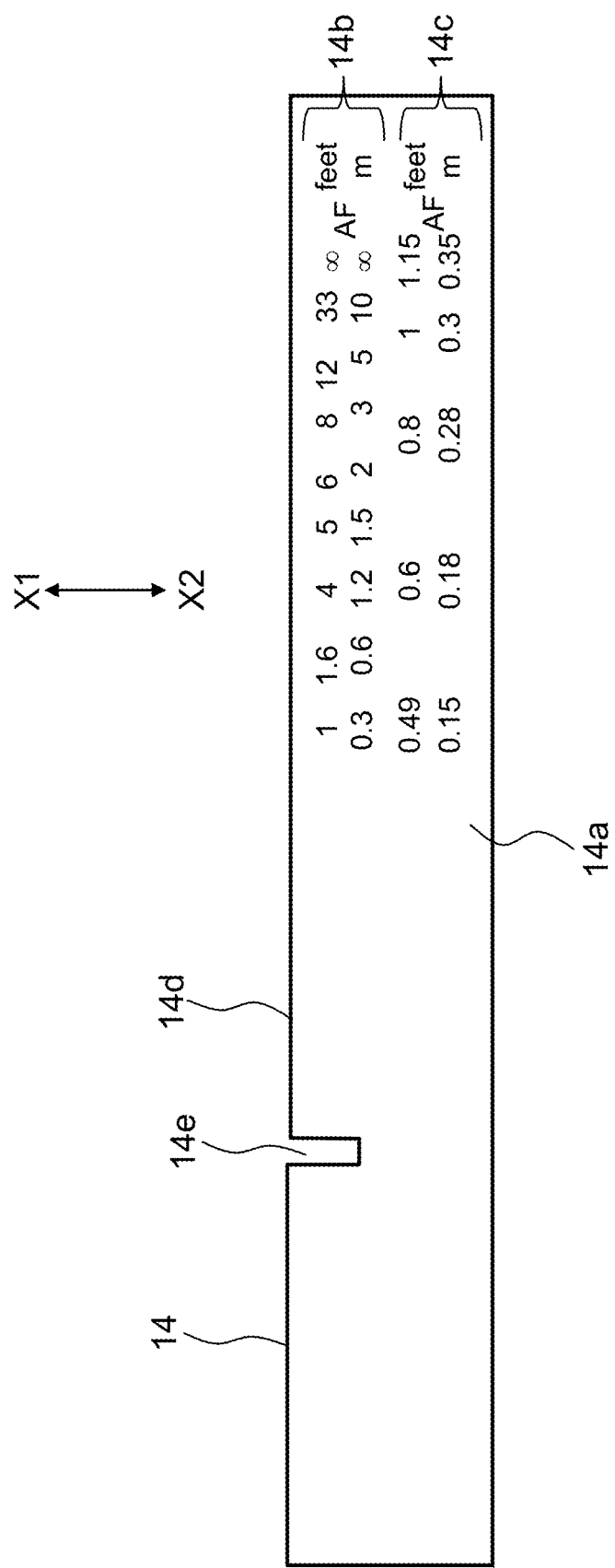
FIG. 14 is a development view of a distance scale ring of the lens barrel in FIG. 1.

FIG. 14 is a plan view of distance scale ring 14. Distance scale ring 14 has, on outer circumferential surface 14a, first distance scale indicator 14b for the normal shooting mode and second distance scale indicator 14c for the macro shooting mode.

First distance scale indicator 14b is disposed in front of second distance scale indicator 14c in the direction of optical axis X.

Figure 15:
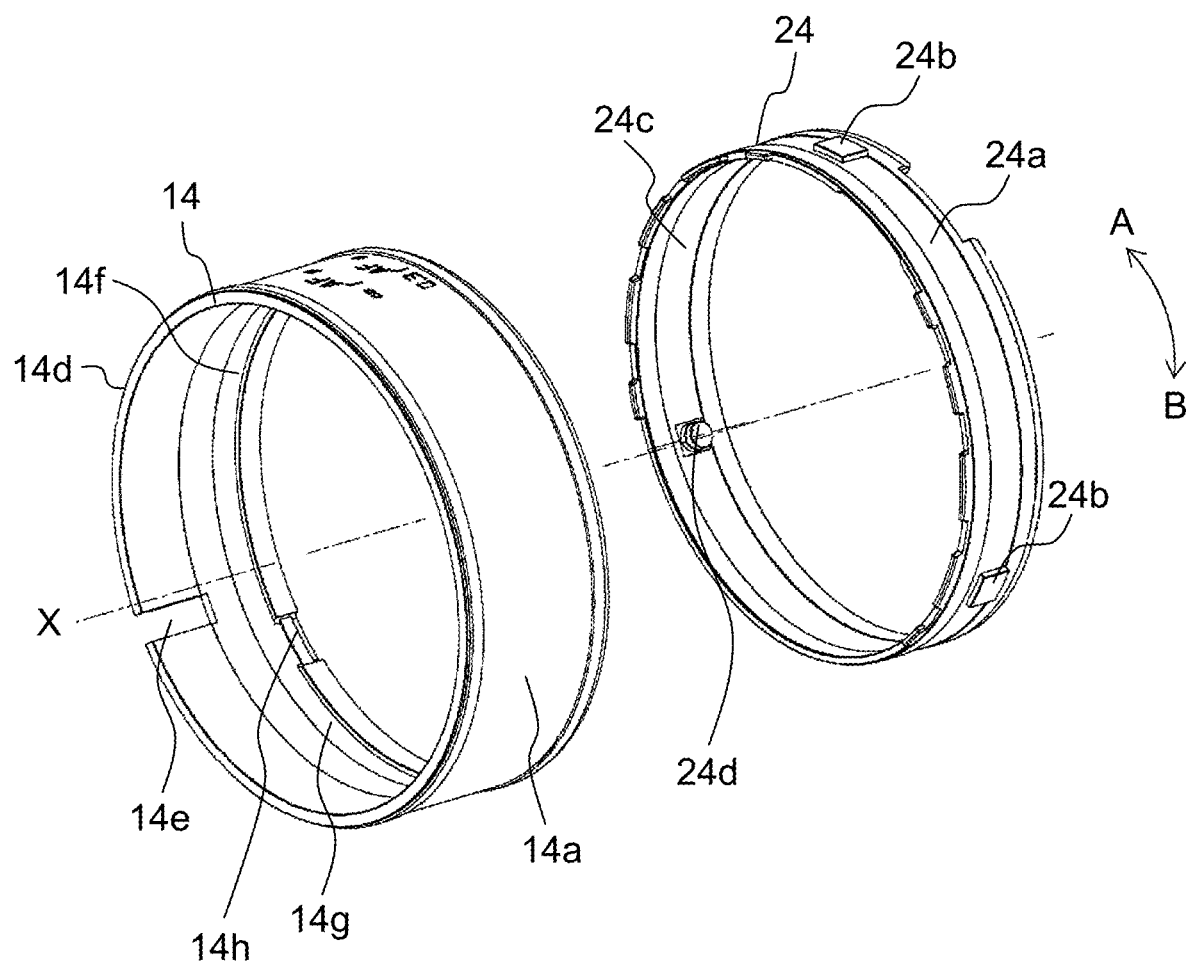
FIG. 15 is a perspective view of the distance scale ring and a cam pin frame of the lens barrel in FIG. 1.

FIG. 15 is an enlarged perspective view of distance scale ring 14 and cam pin frame 24.

As illustrated in FIG. 15, distance scale ring 14 has through groove 14e extending along the direction of optical axis X from front peripheral edge 14d of distance scale ring 14 in the direction of optical axis X. As illustrated in FIG. 11B, fixing button 21 is engaged with through groove 14e. In FIG. 11B, distance scale ring 14 is hatched for easy understanding.

In addition, guide groove 14g is formed entirely along the circumferential direction on inner circumferential surface 14f of distance scale ring 14 and behind through groove 14e. Inner circumferential surface 14f is also formed with insertion groove 14h for inserting protrusion 24b on cam pin frame 24 into guide groove 14g. Three insertion grooves 14h, each of which is formed along the direction of optical axis X, are disposed at substantially regular intervals in the circumferential direction.

When macro switching ring 16 is rotated, distance scale ring 14 is moved in the optical axis direction by stationary frame 17, cam pin frame 24, cam frame 25, fixing button 21, and the like illustrated in FIG. 4.

(Cam Pin Frame)

Cam pin frame 24 is disposed inside of distance scale ring 14. Cam pin frame 24 has three protrusions 24b on outer circumferential surface 24a. Protrusions 24b are provided at substantially regular intervals in the circumferential direction. Protrusions 24b are inserted into guide groove 14g along insertion grooves 14h on distance scale ring 14 from behind, whereby cam pin frame 24 is disposed inside of distance scale ring 14. In addition, protrusions 24b can move in the circumferential direction along guide groove 14g, so that distance scale ring 14 is configured to be freely rotatable with respect to cam pin frame 24.

Figure 16:
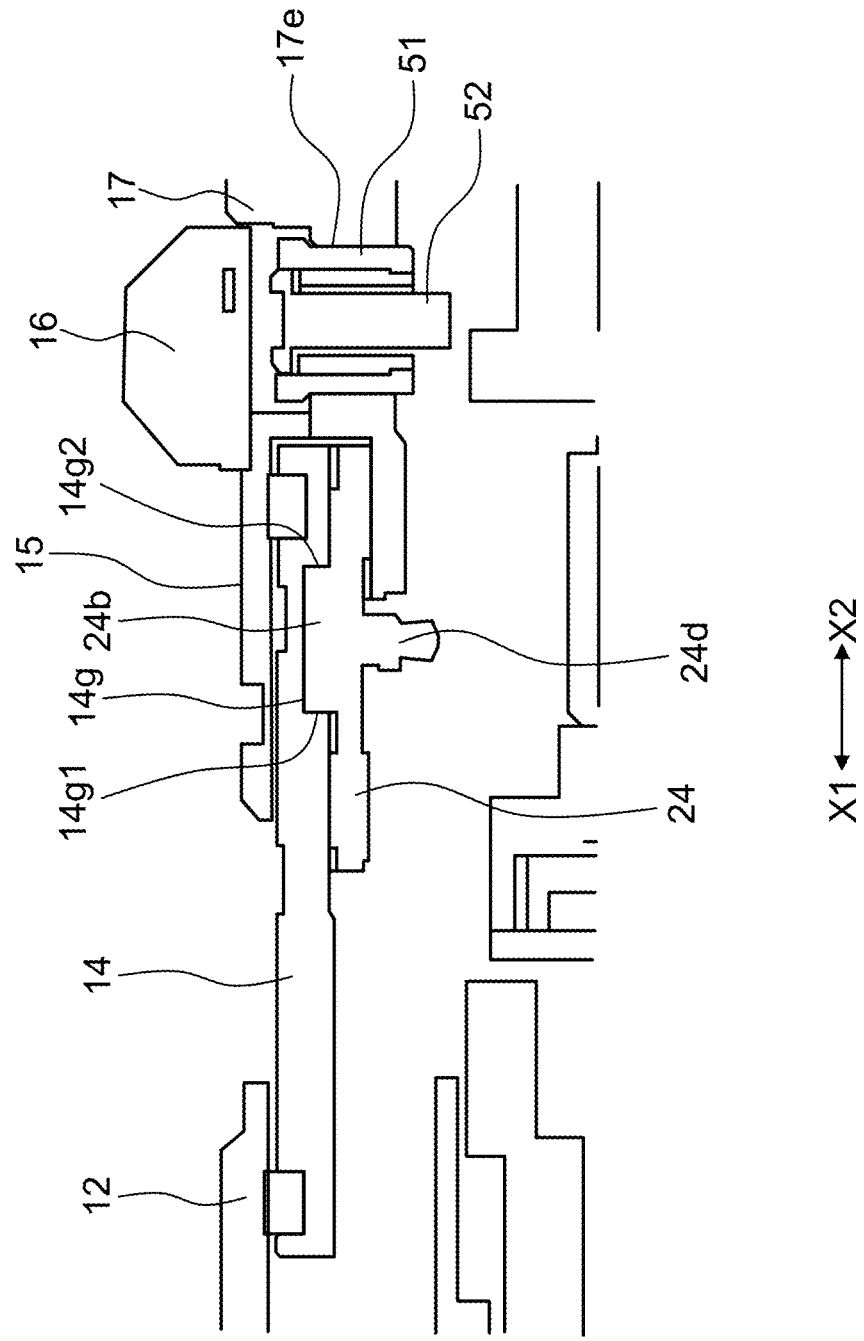
FIG. 16 is a sectional view for describing an arrangement state of the distance scale ring and the cam pin frame in FIGS. 14 and 15.

FIG. 16 is a sectional view, parallel to optical axis X, illustrating a state where protrusions 24b are engaged with cam pin frame 24. When cam pin frame 24 is moved back and forth in the optical axis direction, protrusions 24b are brought into contact with front and rear edges 14g1, 14g2 of guide groove 14g in the optical axis direction, so that distance scale ring 14 moves back and forth along with cam pin frame 24.

In addition, cam pin frame 24 is provided with cam pin 24d on inner circumferential surface 24c. Cam pin 24d is engaged with first through guide groove 17c (see FIG. 17)

formed on the outer circumferential surface of stationary frame 17 along the optical axis direction.

Cam pin 24d of cam pin frame 24 penetrates first through guide groove 17c to be engaged with first cam groove 61 (see FIG. 18) on cam frame 25 disposed radially inside of stationary frame 17.

(Stationary Frame)

Figure 17:
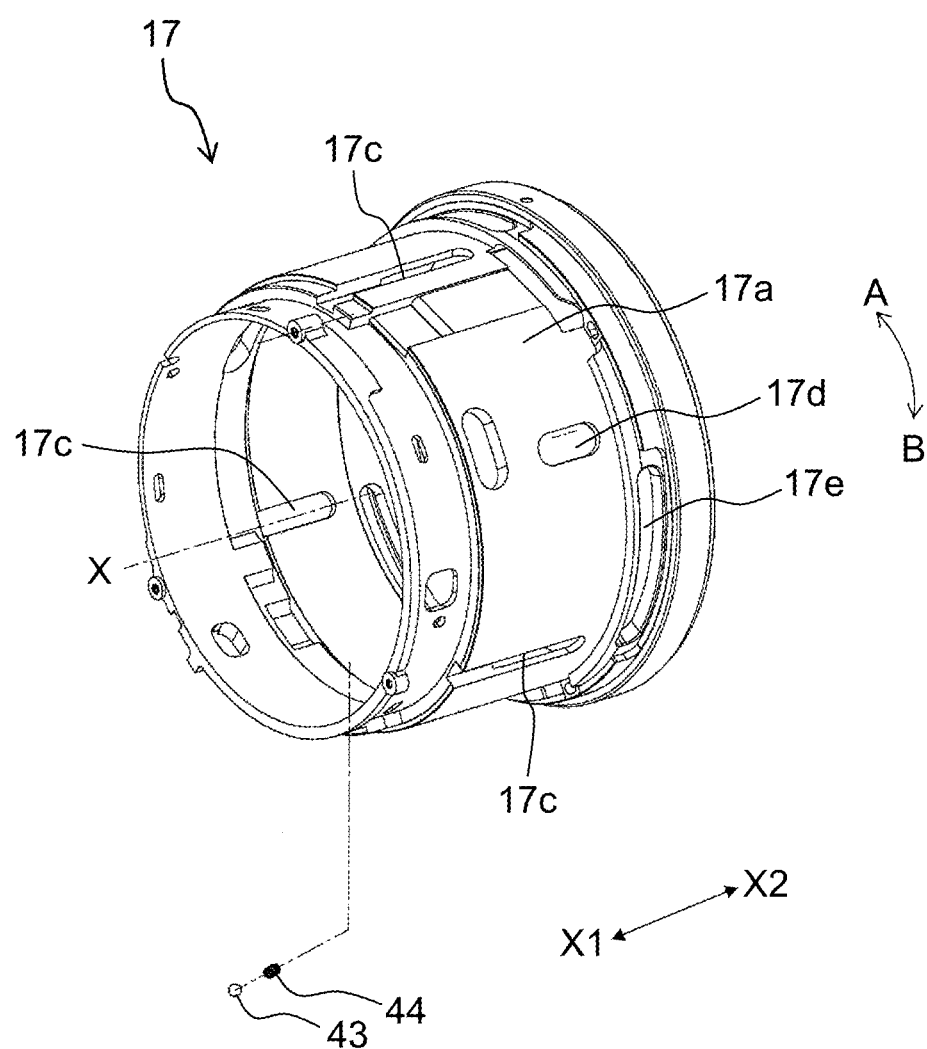
FIG. 17 is a perspective view illustrating a configuration of a stationary frame of the lens barrel in FIG. 1.

FIG. 17 is a perspective view illustrating an outer appearance of stationary frame 17.

Stationary frame 17 (one example of a support frame) is a cylindrical member made of aluminum, and has recess 17b (see FIG. 11A) on outer surface 17a as described above. Fixing ball spring 44 and fixing ball 43 are disposed in recess 17b.

Stationary frame 17 has, on outer surface 17a, first through guide groove 17c, second through guide groove 17d, and third through guide groove 17e.

Three first through guide grooves 17c, each of which is formed along the direction of optical axis X, are disposed at substantially regular intervals in the circumferential direction. Protrusions 24b of cam pin frame 24 disposed radially outside of stationary frame 17 are externally inserted into first through guide grooves 17c.

Three second through guide grooves 17d, each of which is formed along the direction of optical axis X, are disposed at substantially regular intervals in the circumferential direction. Cam pins 38 provided on lens unit 10 are internally inserted into second through guide grooves 17d. Notably, first through guide grooves 17c and second through guide grooves 17d are alternately formed in the circumferential direction.

Third through guide groove 17e is formed along the circumferential direction on a rear end side of stationary frame 17. Three third through guide grooves 17e are disposed at substantially regular intervals in the circumferential direction. Cam pins 51 provided on cam frame 25 which is disposed inside of stationary frame 17 are internally inserted into third through guide grooves 17e.

(Cam Frame)

Figure 18:
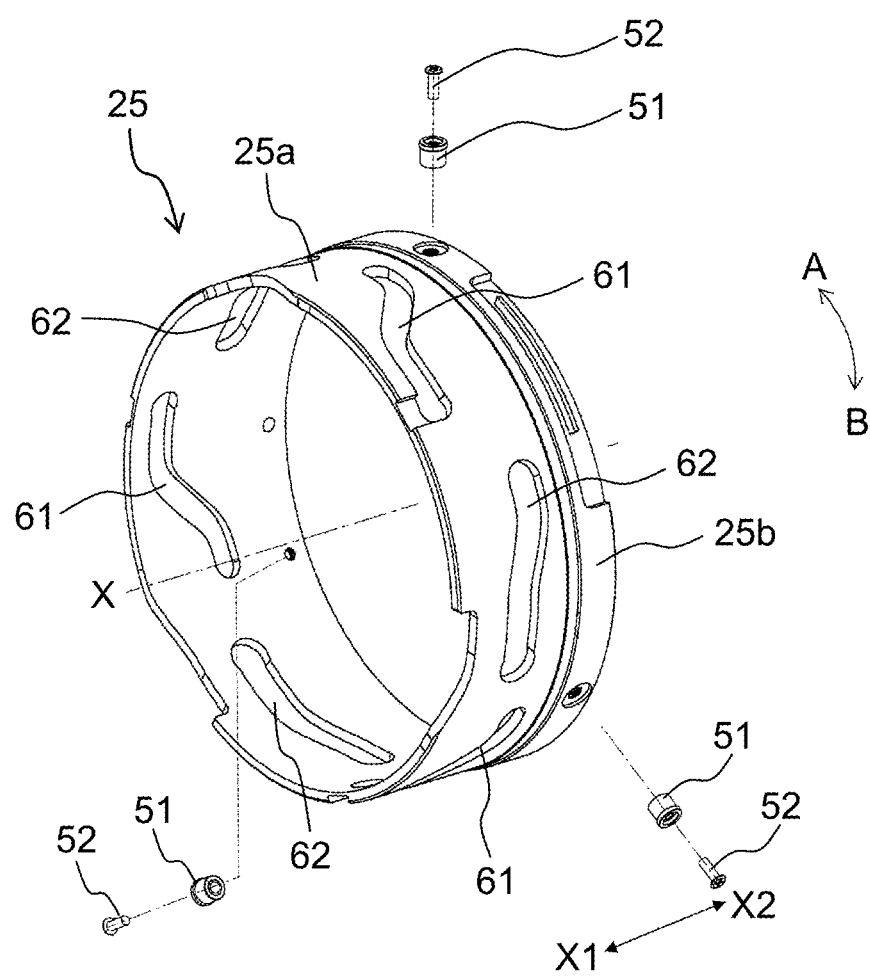
FIG. 18 is a perspective view illustrating a configuration of a cam frame of the lens barrel in FIG. 1.

FIG. 18 is a perspective view of cam frame 25.

Referring to FIG. 4, cam frame 25 is a cylindrical member made of aluminum and is disposed on the outer circumferential surface side of fourth group lens frame unit 34 and on the inner circumferential surface side of stationary frame 17.

Cam frame 25 has cylindrical section 25a formed with a plurality of cam grooves, and end section 25b projecting radially outwardly from cylindrical section 25a behind cylindrical section 25a in the direction of optical axis X.

Cam pins 51 are disposed on three locations of end section 25b along the circumferential direction. Each of cam pins 51 is fixed on the outer surface of end section 25b by means of screw 52. Each cam pin 51 is engaged with recess 16a (see FIG. 4) on the inside of macro switching ring 16 through third through guide groove 17e on stationary frame 17 as illustrated in FIG. 16.

Accordingly, due to the rotation of macro switching ring 16, cam pins 51 also rotate, so that cam frame 25 rotates.

Cylindrical section 25a is formed with three first cam grooves 61 and three second cam grooves 62. First cam grooves 61 and second cam grooves 62 are alternately provided in the circumferential direction.

Figure 19:
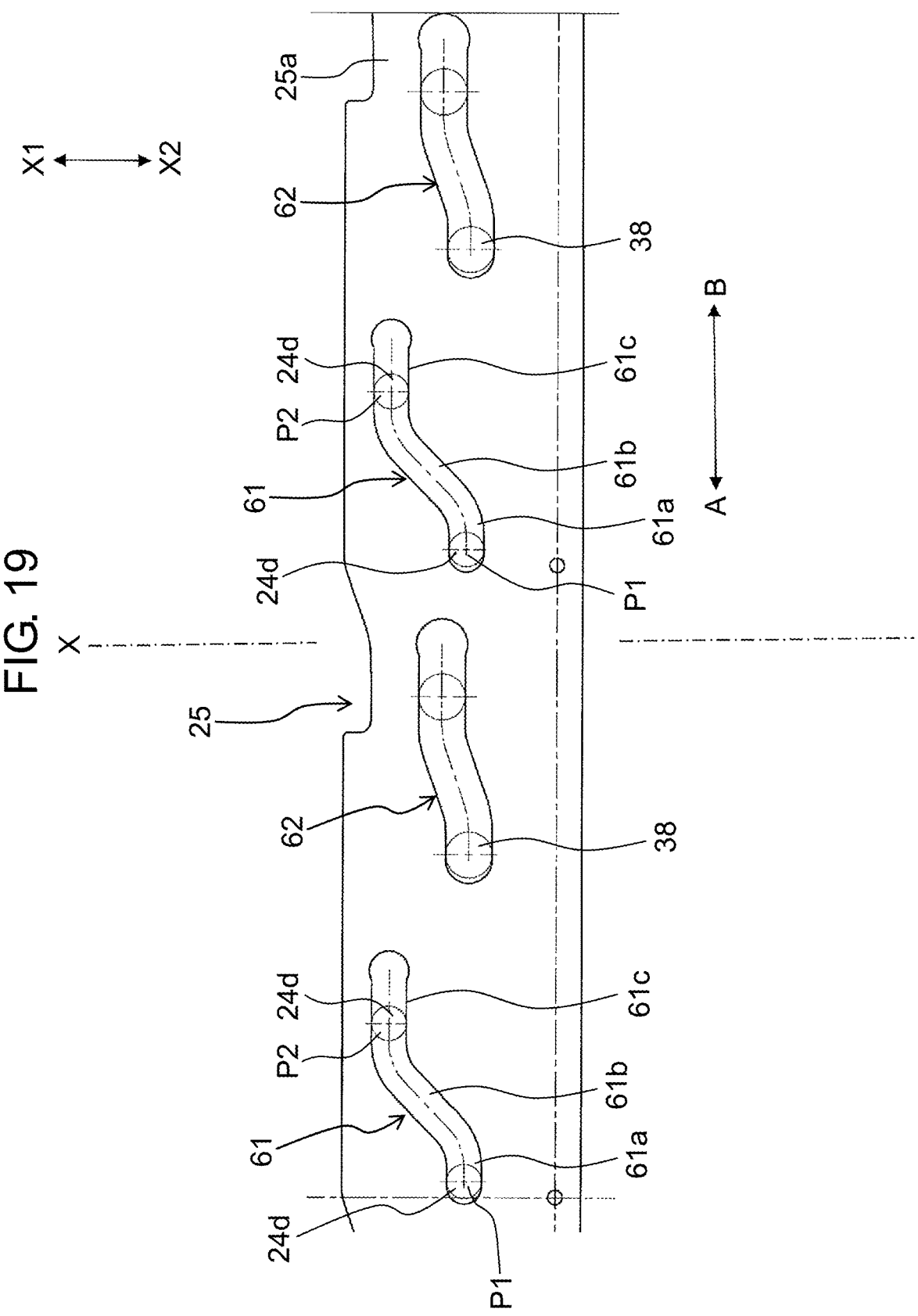
FIG. 19 is a development view illustrating the cam frame in FIG. 18.

FIG. 19 is a partial development view of cam frame 25 as viewed from inside. As illustrated in FIG. 19, first cam grooves 61 are for driving distance scale ring 14 in the direction of the optical axis, and cam pins 24d on cam pin frame 24 penetrating through first through guide grooves 17c on stationary frame 17 are externally inserted into first cam grooves 61. Each first cam groove 61 has first linear section 61a, tilt section 61b, and second linear section 61c. First linear section 61a is linearly formed along the circumferential direction. Tilt section 61b extends from an end of first linear section 61a on the B-direction side, and tilts forward in the direction of arrow B. Second linear section 61c linearly extends from an end of tilt section 61b in the direction of arrow B along the circumferential direction. Second linear section 61c is located further in X1 direction (on the subject side) with respect to first linear section 61a. Cam frame 25 rotates with respect to cam pin frame 24 with cam pins 24d moving along first cam grooves 61.

(Switching Between Normal Shooting Mode and Macro Shooting Mode)

In the normal shooting mode, cam pins 24d are disposed on normal positions P1 on the ends (far positions) of first linear sections 61a in the direction of arrow B. When macro switching ring 16 is rotated in the direction of arrow A (see FIG. 4), cam frame 25 rotates in the direction of arrow A through cam pins 51. Due to the rotation of cam frame 25, cam pins 24d engaged with first cam grooves 61 relatively move to second linear sections 61c from first linear sections 61a through tilt sections 61b.

Due to the rotation of macro switching ring 16 in the direction of arrow A, cam frame 25 rotates in the direction of arrow A through cam pins 51 inserted into third through guide grooves 17e on stationary frame 17. According to this rotation, first cam grooves 61 also rotate, whereby cam pins 24d move along first cam grooves 61. It can also be said that cam pins 24d move in the direction of arrow B with respect to cam frame 25.

Notably, after the switching from the normal shooting mode to the macro shooting mode, cam pins 24d are located on macro positions P2 on substantially the center of second linear sections 61c.

FIG. 20A is a view illustrating the relation among distance scale ring 14, cam pin frame 24, and cam frame 25 in the normal shooting mode. FIG. 20B is a view illustrating the relation among distance scale ring 14, cam pin frame 24, and cam frame 25 in the macro shooting mode.

Due to the rotation of cam frame 25, cam pins 24d move from first linear sections 61a to second linear sections 61c. Cam pins 24d also move to the front (arrow X1) along optical axis X, because cam pins 24d are inserted into first through guide grooves 17c on stationary frame 17. Thus, cam pin frame 24 provided with cam pins 24d moves forward (direction of arrow X1) along optical axis X.

With the forward movement of cam pin frame 24 along optical axis X, distance scale ring 14 engaged with cam pin frame 24 also moves forward.

While distance scale ring 14 is provided to be freely rotatable with respect to cam pin frame 24, fixing button 21 is inserted into through groove 14e. Therefore, fixing button 21 functions as a guide in the optical axis direction, so that distance scale ring 14 moves along optical axis X without rotating in the circumferential direction. Notably, cam pins 38 are inserted into second cam grooves 62 and also inserted into second through guide grooves 17d, whereby cam pins 38 move forward (arrow X1) along optical axis X due to the rotation of macro switching ring 16 in the direction of arrow A, and thus lens unit 10 moves forward (arrow X1) along optical axis X.

Figure 21A:
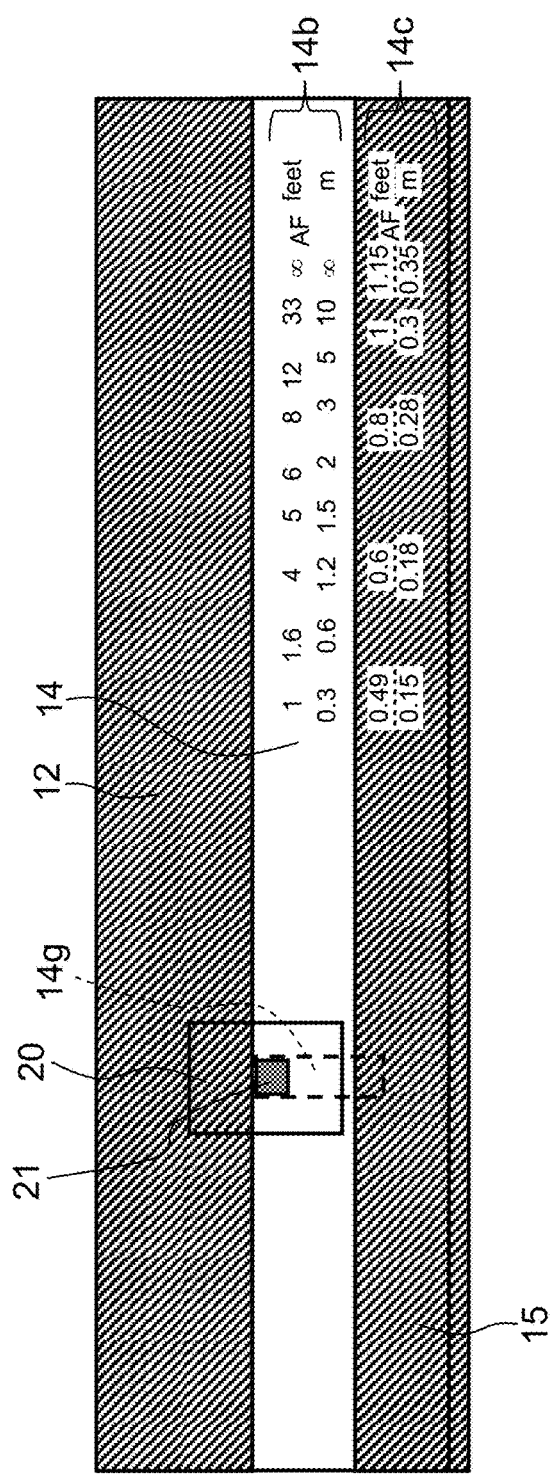
FIG. 21A is a view for describing switching of a scale indicator due to the movement of the distance scale ring.
Figure 21B:
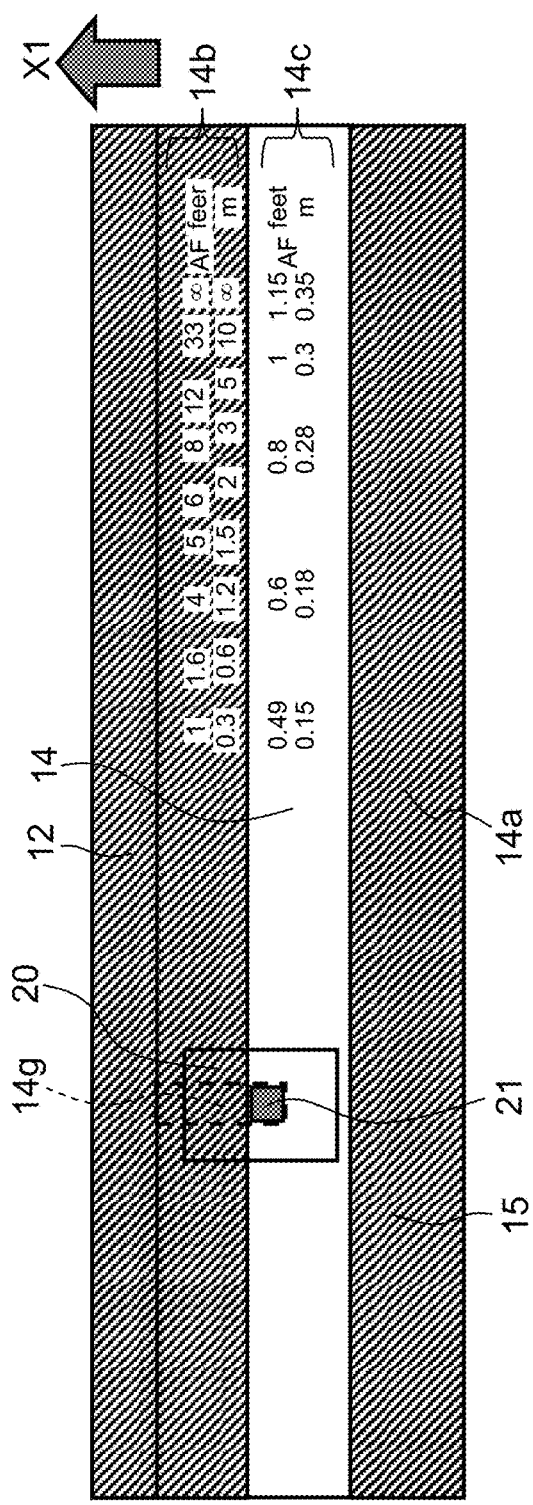
FIG. 21B is a view for describing switching of a scale indicator due to the movement of the distance scale ring.

FIG. 21A illustrates a view of the indicator on distance scale ring 14 in the normal shooting mode. FIG. 21B illustrates a view of the indicator on distance scale ring 14 in the macro shooting mode.

As illustrated in FIG. 21A, in the normal shooting mode, a user visually recognizes first distance scale indicator 14b. Second distance scale indicator 14c for the macro shooting mode is covered by depth-of-field scale ring 15. In FIGS. 21A and 21B, scales in a shaded area are covered and invisible.

On the other hand, as described with reference to FIGS. 20A and 20B, when distance scale ring 14 moves forward (arrow X1) along optical axis X due to the switching from the normal shooting mode to the macro shooting mode, the front end part of distance scale ring 14 is inserted into focus ring 12, and second distance scale indicator 14c appears from the inside of depth-of-field scale ring 15. Accordingly, the user can visually recognize first distance scale indicator 14b for the macro shooting mode in the macro shooting mode, and can visually recognize second distance scale indicator 14c for the normal shooting mode in the normal shooting mode.

Since fixing button 21 is inserted into through groove 14e as illustrated in FIGS. 20A and 20B, distance scale ring 14 rotates with the rotation of focus ring 12.

(Main Features)

(1)

Lens barrel 1 according to the present exemplary embodiment is provided with lens unit 10, stationary frame 17 (one example of a support frame), focus ring 12, focus grip 20 (one example of an operating section), and fixing section 40. Lens unit 10 has an optical system. Stationary frame 17 supports lens unit 10 to be movable in a direction of optical axis X of the optical system. Focus ring 12 is disposed on an outer circumferential side of lens unit 10, and is rotated when focus adjustment is manually performed. Focus grip 20 is provided to protrude outwardly from focus ring 12, and operated for rotating focus ring 12. Fixing section 40 fixes focus ring 12 to stationary frame 17 when focus adjustment is automatically performed. Fixing section 40 has fixing button 21. Fixing button 21 is disposed on focus grip 20, and operated for fixing focus ring 12 to stationary frame 17.

As described above, fixing button 21 is provided on focus grip 20, whereby a user can easily switch between a manual focus mode and an auto-focus mode with his/her finger being placed on focus ring 12.

(2)

Lens barrel 1 according to the present exemplary embodiment is further provided with distance scale ring 14. Distance scale ring 14 has through groove 14e, first distance scale indicator 14b, and second distance scale indicator 14c. Through groove 14e is formed along the direction of optical axis X, and fixing button 21 is engaged with through groove 14e. First distance scale indicator 14b is formed along a circumferential direction, and indicates a scale of distance for a normal shooting mode. Second distance scale indicator 14c is formed adjacent to first distance scale indicator 14b in the direction of optical axis X, and indicates a scale of distance for a macro shooting mode. When focus ring 12 rotates, distance scale ring 14 rotates along with focus ring 12 by engagement between fixing button 21 and through groove 14e.

According to this configuration, distance scale ring 14 which can switch a distance indicator can rotate along with focus ring 12.

In addition, fixing button 21 which is depressed for switching to the auto-focus mode is used to cause distance scale ring 14 to rotate along with focus ring 12, whereby it is unnecessary to provide an additional member, and thus, the number of components can be reduced.

(3)

In lens barrel 1 according to the present exemplary embodiment, first distance scale indicator 14b is disposed closer to focus ring 12 with respect to second distance scale indicator 14c in the normal shooting mode. In switching between the normal shooting mode and the macro shooting mode, fixing button 21 relatively moves along through groove 14e, whereby distance scale ring 14 moves with respect to focus ring 12 in the direction of optical axis X. In the macro shooting mode, first distance scale indicator 14b is located radially inside of focus ring 12, and second distance scale indicator 14c is located adjacent to focus ring 12.

According to this configuration, in the macro shooting mode, second distance scale indicator 14c for the macro shooting mode can visually be recognized by a user.

(4)

Lens barrel 1 according to the present exemplary embodiment includes cam pin frame 24 and cam frame 25. Cam pin frame 24 has cam pin 24d on inner circumferential surface 24c, and is disposed inside of distance scale ring 14. Cam frame 25 has first cam groove 61 (one example of a cam groove) engaged with cam pin 24d, cam frame 25 causing cam pin frame 24 to relatively move in the direction of optical axis X due to a relative rotation of cam pin frame 24 with cam pin 24d being engaged with first cam groove 61.

Cam pin frame 24 is engaged with distance scale ring 14 so that a relative rotation in a circumferential direction is allowed and a relative movement in the direction of optical axis X is restricted.

In switching between the normal shooting mode and the macro shooting mode, cam pin frame 24 moves with respect to cam frame 25 in the direction of optical axis X due to the rotation of cam frame 25, and distance scale ring 14 moves in the direction of optical axis X along with cam pin frame 24.

According to this configuration, distance scale ring 14 can be moved in the direction of optical axis X while being allowed to be rotated.

(5)

In lens barrel 1 according to the present exemplary embodiment, fixing section 40 includes rotation restricting section 13b (one example of a first restricting section) and movement restricting section 45 (one example of a second restricting section). Rotation restricting section 13b restricts a relative rotation of focus ring 12 with respect to lens unit 10 within a predetermined range between an auto-focus position (one example of a first position) and a nearest position (one example of a second position).

Movement restricting section 45 restricts the movement of focus ring 12 to the auto-focus position and the movement of focus ring 12 from the auto-focus position. The restriction by movement restricting section 45 is released by depression of fixing button 21. The auto-focus position indicates a position where focus ring 12 is fixed to stationary frame 17 when focus adjustment is automatically performed.

According to this configuration, focus ring 12 can be fixed to stationary frame 17 in the auto-focus mode.

(6)

In lens barrel 1 according to the present exemplary embodiment, movement restricting section 45 has fixing ball 43 (one example of a restricting member), fixing ball spring 44 (one example of a first biasing member), fixing pin 41 (one example of a restricted member), and fixing button spring 42 (one example of a second biasing member). Fixing ball 43 is disposed in recess 17b formed on outer surface 17a of stationary frame 17. Fixing ball spring 44 biases fixing ball 43 disposed in recess 17b so as to protrude from outer surface 17a. Fixing pin 41 moves along outer surface 17a of stationary frame 17 with the rotation of focus ring 12 when focus adjustment is manually performed, and when focus adjustment is automatically performed, the movement of fixing pin 41 is restricted by interference with fixing ball 43 protruding from outer surface 17a. Fixing ball spring 44 biases fixing button 21 which is disposed to cover fixing pin 41 outwardly with respect to fixing pin 41. Fixing button 21 has radially inner end 21a (one example of a pushing section) which pushes fixing ball 43 into recess 17b when being depressed, for moving fixing pin 41 beyond fixing ball 43. The movement of focus ring 12 to the auto-focus position and the movement of focus ring 12 from the auto-focus position are restricted by interference between fixing ball 43 and fixing pin 41.

According to this configuration, focus ring 12 can be fixed to stationary frame 17 in the auto-focus mode, and can easily be moved from the auto-focus position by depression of fixing button 21. Specifically, switching between the auto-focus mode and the manual focus mode can easily be achieved.

Other Exemplary Embodiments

One exemplary embodiment of the present disclosure has been described above, but the present disclosure is not limited thereto, and various modifications may be made without departing from the scope of the present disclosure.
(A)
In the exemplary embodiment described above, the rotation range of focus ring 12 is restricted by index ring 13. However, the configuration is not limited thereto. For example, a portion which is in contact with protrusions 12c, 12d on focus ring 12 may be formed on stationary frame 17 to restrict the rotation range of focus ring 12.
(B)
In the exemplary embodiment described above, in the normal shooting mode, second distance scale indicator 14c used for the macro shooting mode is covered by depth-of-field scale ring 15. However, depth-of-field scale ring 15 may not be provided.
(C)
Lens barrel 1 in the above-mentioned exemplary embodiment is an exchangeable lens having lens mount 19 and detachable from the camera body. However, lens barrel 1 may be undetachable and fixed to the camera body.

The lens barrel according to the present disclosure has an effect of being capable of improving operability in switching between the manual focus mode and the auto-focus mode, and is useful for a lens barrel or the like used for a camera.

REFERENCE MARKS IN THE DRAWINGS 1 lens barrel
10 lens unit
11 aperture ring
12 focus ring
13 index ring
13a mark indicator
13b rotation restricting section (one example of first restricting section)
14 distance scale ring
14b first distance scale indicator
14c second distance scale indicator
14e through groove
15 depth-of-field scale ring
16 macro switching ring
17 stationary frame (one example of support frame)
18 rear frame
19 lens mount
20 focus grip (one example of operating section)
21 fixing button
21a end (one example of pushing section)
22 lens control board
23 linear encoder
24 cam pin frame
25 cam frame
31 first group lens frame unit
32 second group lens frame unit
33 third group lens frame unit
34 fourth group lens frame unit
35 fifth group lens frame unit
40 fixing section
41 fixing pin (one example of restricted member)
42 fixing button spring (one example of second biasing member)
43 fixing ball (one example of restricting member)
44 fixing ball spring (one example of first biasing member)
45 movement restricting section (one example of second restricting section)
61 first cam groove (one example of cam groove)
62 second cam groove

What is claimed is:
1. A lens barrel comprising:
a lens unit provided with an optical system;
a support frame that supports the lens unit to be movable in a direction of an optical axis of the optical system;
a focus ring that is disposed on an outer circumferential side of the lens unit and is rotatably operated with respect to the lens unit for manually performing focus adjustment;
an operating section that is provided to protrude radially outwardly from the focus ring, and is operated for rotating the focus ring;
a fixing section for fixing the focus ring to the support frame when the focus adjustment is automatically performed; and
a distance scale ring provided with:
a through groove which is formed along the direction of the optical axis and with which the fixing button is engaged;
a first distance scale indicator formed along a circumferential direction with respect to the optical axis and indicating a scale of distance for a normal shooting mode; and
a second distance scale indicator formed parallel to, and offset along the optical axis from, the first distance scale indicator and indicating a scale of distance for a macro shooting mode,
wherein, when the focus ring rotates, the distance scale ring rotates along with the focus ring by engagement between the fixing button and the through groove, and
wherein the fixing section has a fixing button that is operated for fixing the focus ring to the support frame, the fixing button being disposed on the operating section.
2. The lens barrel according to claim 1, wherein
the first distance scale indicator is disposed closer to the focus ring with respect to the second distance scale indicator in the direction of the optical axis in the normal shooting mode, in switching between the normal shooting mode and the macro shooting mode, the fixing button relatively moves along the through groove, by which the distance scale ring moves with respect to the focus ring in the direction of the optical axis, and in the macro shooting mode, the first distance scale indicator is disposed radially inside of the focus ring, and the second distance scale indicator is disposed adjacent to the focus ring in the direction of the optical axis.

3. The lens barrel according to claim 1, further comprising:

a cam pin frame having a cam pin on an inner circumferential surface and disposed inside of the distance scale ring; and a cam frame having a cam groove engaged with the cam pin, the cam frame causing the cam pin frame to relatively move in the direction of the optical axis due to a relative rotation of the cam pin frame with the cam pin being engaged with the cam groove, wherein the cam pin frame is engaged with the distance scale ring so that a relative rotation in a circumferential direction is allowed and a relative movement in the direction of the optical axis is restricted, and in switching between the normal shooting mode and the macro shooting mode, the cam pin frame moves with respect to the cam frame in the direction of the optical axis due to a rotation of the cam frame, and the distance scale ring moves in the direction of the optical axis along with the cam pin frame.

4. The lens barrel according to claim 2, further comprising:

a cam pin frame having a cam pin on an inner circumferential surface and disposed inside of the distance scale ring; and a cam frame having a cam groove engaged with the cam pin, the cam frame causing the cam pin frame to relatively move in the direction of the optical axis due to a relative rotation of the cam pin frame with the cam pin being engaged with the cam groove, wherein the cam pin frame is engaged with the distance scale ring so that a relative rotation in a circumferential direction is allowed and a relative movement in the direction of the optical axis is restricted, and in switching between the normal shooting mode and the macro shooting mode, the cam pin frame moves with respect to the cam frame in the direction of the optical axis due to a rotation of the cam frame, and the distance scale ring moves in the direction of the optical axis along with the cam pin frame.

5. The lens barrel according to claim 1, wherein the fixing section includes:

a first restricting section that restricts a relative rotation of the focus ring with respect to the lens unit within a predetermined range between a first position and a second position; and a second restricting section that restricts a movement of the focus ring to the first position and a movement of the focus ring from the first position, the restriction by the second restricting section is released by depression of the fixing button, and the first position is a position where the focus ring is fixed to the support frame when the focus adjustment is automatically performed.

6. The lens barrel according to claim 5, wherein the second restricting section includes:

a restricting member disposed in a recess formed on an outer surface of the support frame;

a first biasing member that is disposed in the recess and biases the restricting member to protrude radially outwardly from the outer surface;

a restricted member that moves along the outer surface of the support frame with a rotation of the focus ring, when the focus adjustment is manually performed, and that is restricted from being moved by interference with the restricting member protruding radially outwardly from the outer surface, when the focus adjustment is automatically performed; and a second biasing member that is disposed to cover the restricted member and biases the fixing button radially outwardly with respect to the restricted member, the fixing button has a pushing section for pushing the restricting member to the recess, when being depressed, for moving the restricted member beyond the restricting member, and the movement of the focus ring to the first position and the movement of the focus ring from the first position are restricted by interference between the restricting member and the restricted member.

7. The lens barrel according to claim 1, wherein the first distance scale indicator and the second distance scale indicator are in juxtaposition to one another.

* * * * *